June 6, 1933.  H. PINKEL ET AL  1,912,857

METHOD AND MACHINE FOR MECHANICALLY OBTAINING THE PRODUCT OF NUMBERS

Filed Oct. 30, 1928  14 Sheets-Sheet 1

June 6, 1933. H. PINKEL ET AL 1,912,857
METHOD AND MACHINE FOR MECHANICALLY OBTAINING THE PRODUCT OF NUMBERS
Filed Oct. 30, 1928 14 Sheets-Sheet 3

INVENTORS
Hyman Pinkel and
Benjamin Pinkel
BY
Joshua R.H. Potts
ATTORNEY.

Witness:

June 6, 1933.  H. PINKEL ET AL  1,912,857
METHOD AND MACHINE FOR MECHANICALLY OBTAINING THE PRODUCT OF NUMBERS
Filed Oct. 30, 1928  14 Sheets-Sheet 4

INVENTORS
Hyman Pinkel and
Benjamin Pinkel
BY
Joshua R.H.Potts
ATTORNEY.

Witness:

June 6, 1933. H. PINKEL ET AL 1,912,857
METHOD AND MACHINE FOR MECHANICALLY OBTAINING THE PRODUCT OF NUMBERS
Filed Oct. 30, 1928 14 Sheets-Sheet 5

INVENTORS.
Hyman Pinkel and
Benjamin Pinkel
BY Joshua R.H. Potts
ATTORNEY.

June 6, 1933.  H. PINKEL ET AL  1,912,857
METHOD AND MACHINE FOR MECHANICALLY OBTAINING THE PRODUCT OF NUMBERS
Filed Oct. 30, 1928  14 Sheets-Sheet 8
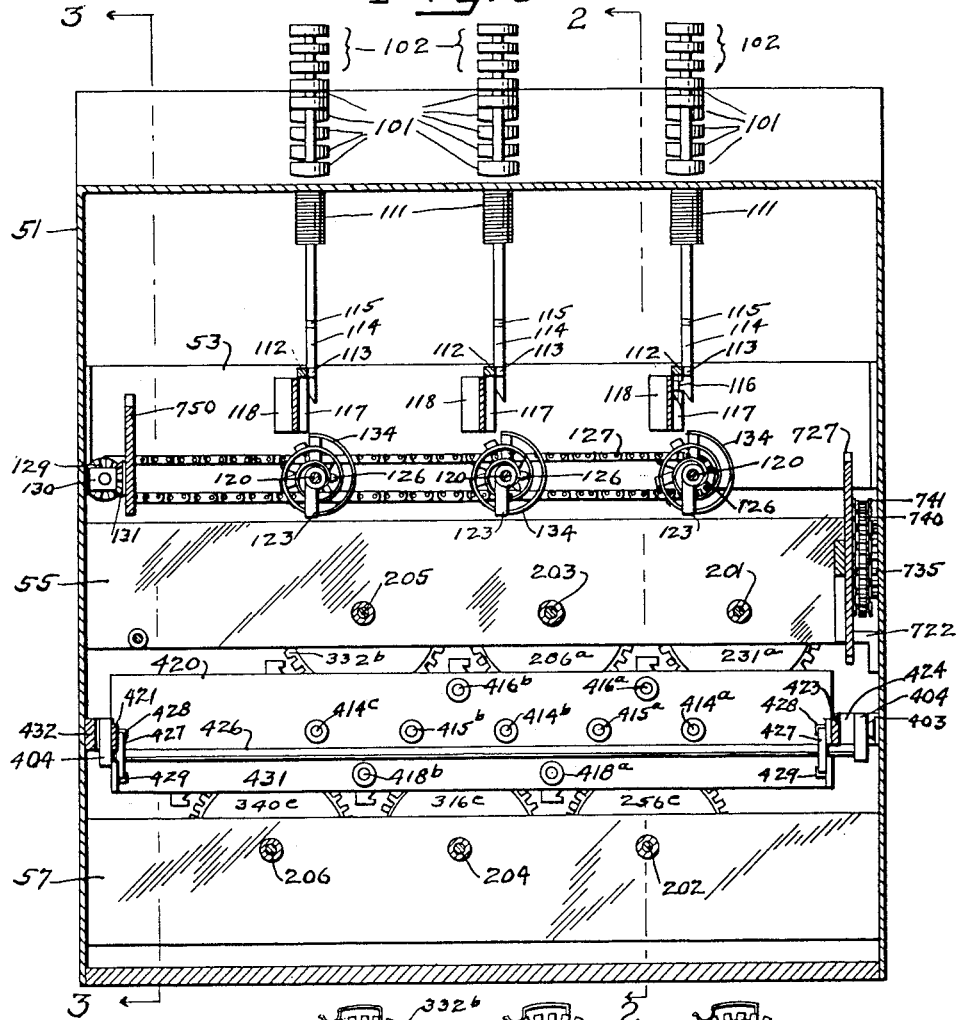
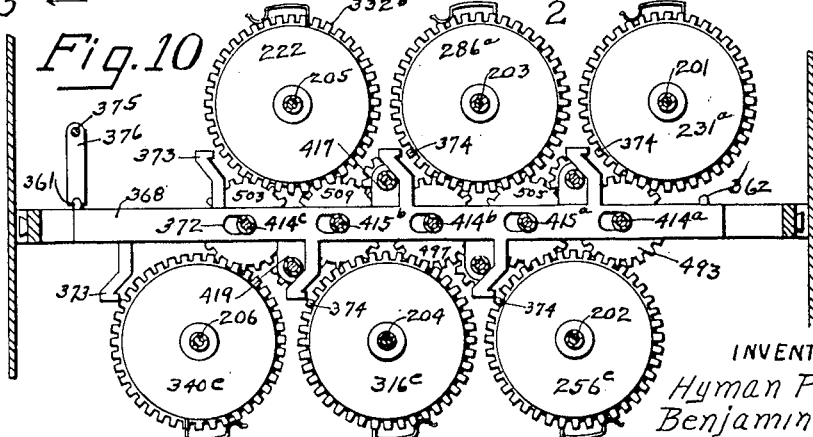
INVENTORS.
Hyman Pinkel
Benjamin Pinkel.
ATTORNEY.

June 6, 1933. H. PINKEL ET AL 1,912,857
METHOD AND MACHINE FOR MECHANICALLY OBTAINING THE PRODUCT OF NUMBERS
Filed Oct. 30, 1928 14 Sheets-Sheet 9

Witness:

INVENTORS
Hyman Pinkel and
Benjamin Pinkel
By Joshua R.H. Potts
ATTORNEY

June 6, 1933.  H. PINKEL ET AL  1,912,857
METHOD AND MACHINE FOR MECHANICALLY OBTAINING THE PRODUCT OF NUMBERS
Filed Oct. 30, 1928   14 Sheets-Sheet 10
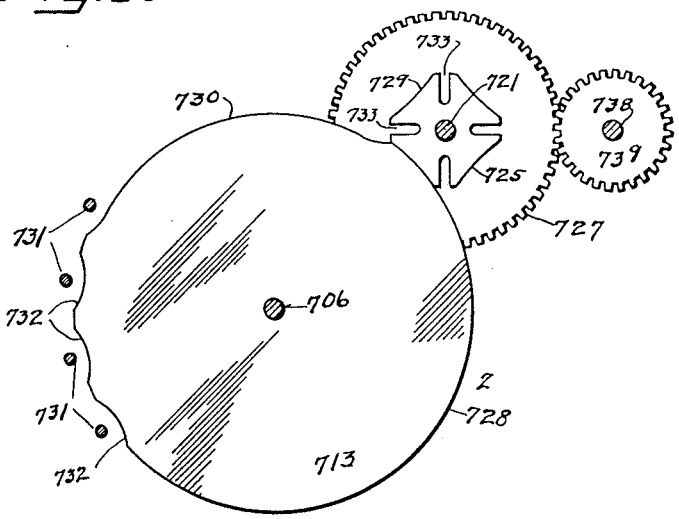
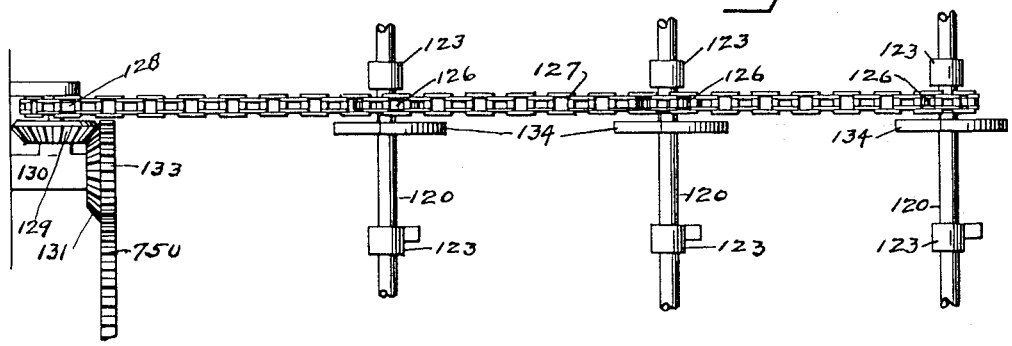
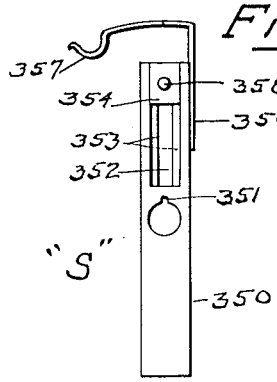
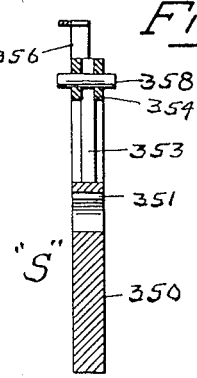
INVENTORS.
Hyman Pinkel and
Benjamin Pinkel
Joshua R. H. Potts
ATTORNEY
Witness:
W. P. Merrill INVENTORS
Hyman Pinkel and
Benjamin Pinkel.
BY
Joshua R.H. Potts
ATTORNEY.

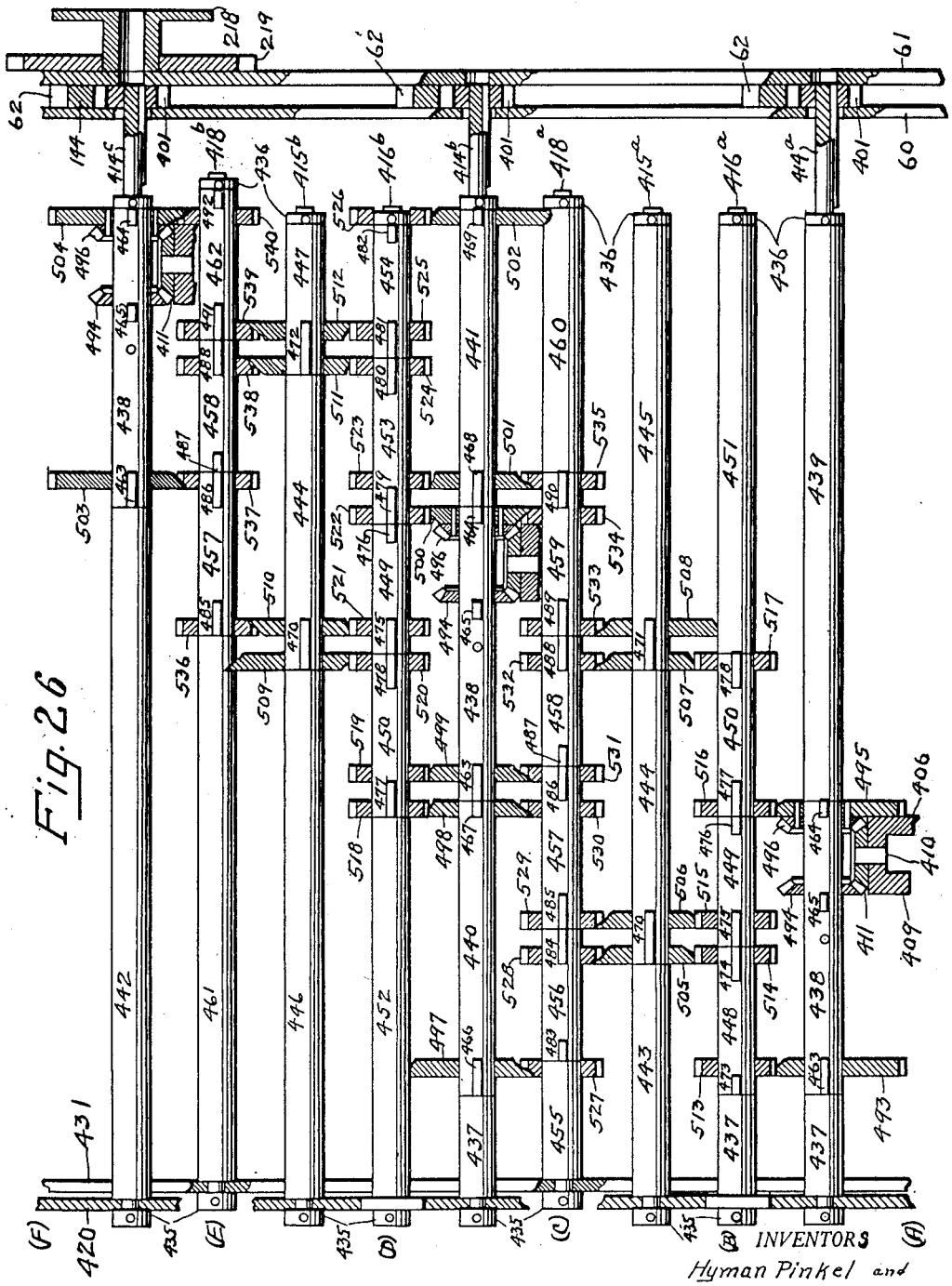

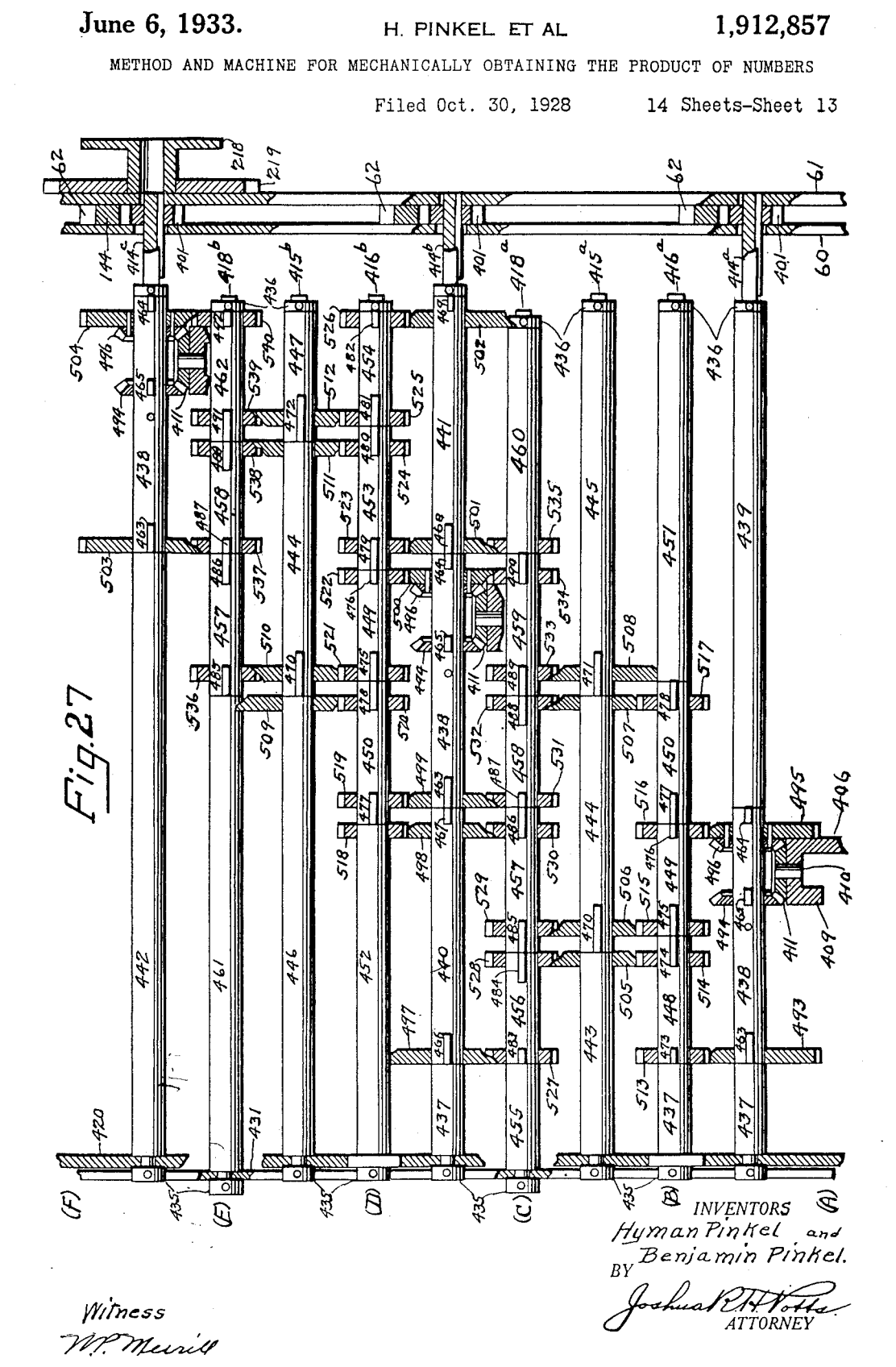

TABLE IV

UNITED STATES PATENT OFFICE

HYMAN PINKEL AND BENJAMIN PINKEL, OF PHILADELPHIA, PENNSYLVANIA

METHOD AND MACHINE FOR MECHANICALLY OBTAINING THE PRODUCT OF NUMBERS

Application filed October 30, 1928. Serial No. 316,010.

Our invention relates to methods and means for mechanically obtaining the products of numbers.

We are aware that various adding and calculating machines have been heretofore produced but, to the best of our knowledge, all such machines require considerable manipulation in order to obtain the product of two numbers such as the impression of one factor and then subsequently each digit of the other factors with the clearing of the machine for each digit of said second factor.

Among the objects of our invention are to provide a method of mechanically obtaining the product of two numbers and a machine adapted for carrying out the method, and to provide such a machine susceptible of use with a single ordinary keyboard upon which the factors may be successively impressed by impressing all of the digits of each factor and the product thereof obtained by a single manipulation of an operating control.

The basis of our method is the formula that the product of two numbers is equal to one-quarter of the square of the sum of the two numbers minus one-quarter of the square of the difference between the two numbers, and an object of the invention is to provide a method and a machine by which calculation may be made on this basis.

By the use of this formula, which can be used in various forms, we are allowed to bring the multiplier and multiplicand together on certain mechanism in the form of their sum and difference and obtain the product of the two numbers by obtaining the quarter-squares of the sum and difference and then finding the difference between the quarter-squares thus produced.

In multiplying two numbers, the intergers of the multiplicand are individually and successively multiplied by the integers of the multipier. If a number represented by $abc$ is multiplied by a number represented by $fgh$, the individual products of the integers are arranged in columns in the usual manner, as shown in the following table.

Table I

| (F) | (E) | (D) | (C) | (B) | (A) |
|---|---|---|---|---|---|
|  |  |  | $a$ | $b$ | $c$ |
|  |  |  | $f$ | $g$ | $h$ |
|  |  |  | $ah$ | $bh$ | $ch$ |
|  |  | $ag$ | $bg$ | $cg$ |  |
|  | $af$ | $bf$ | $cf$ |  |  |

As previously stated, the product of two numbers is equal to the difference between the quarter-squares of their sum and difference or, expressed algebraically, $$xy = \frac{(x+y)^2}{4} - \frac{(x-y)^2}{4}.$$

By converting the individual products in the several columns of Table I into their algebraic equivalents, that is $$ch = \frac{(c+h)^2}{4} - \frac{(c-h)^2}{4}$$

etc., we have

Table II

| (F) | (E) | (D) | (C) | (B) | (A) |
|---|---|---|---|---|---|
|  |  |  | $a$ | $b$ | $c$ |
|  |  |  | $f$ | $g$ | $h$ |
|  |  |  | $\frac{(a+h)^2}{4} - \frac{(a-h)^2}{4}$ | $\frac{(b+h)^2}{4} - \frac{(b-h)^2}{4}$ | $\frac{(c+h)^2}{4} - \frac{(c-h)^2}{4}$ |
|  |  | $\frac{(a+g)^2}{4} - \frac{(a-g)^2}{4}$ | $\frac{(b+g)^2}{4} - \frac{(b-g)^2}{4}$ | $\frac{(c+g)^2}{4} - \frac{(c-g)^2}{4}$ |  |
|  | $\frac{(a+f)^2}{4} - \frac{(a-f)^2}{4}$ | $\frac{(b+f)^2}{4} - \frac{(b-f)^2}{4}$ | $\frac{(c+f)^2}{4} - \frac{(c-f)^2}{4}$ |  |  |

If the sum of two numbers is even, the difference will also be even and the quarter-squares of the sum and the difference will be whole numbers but, if their sum is odd, their difference will be odd and the quarter-squares of their sum and difference will each contain a fraction. As the quarter-square of the difference is subtracted from the quarter-square of the sum, the fractions, if any, cancel each other and have been disregarded in the construction of the machine.

As one-half of the quantities are negative, they may be subtracted directly from the positive quantities or the complements of the negative quantities used. In the latter case, the complements of the negative quantities are added to the positive quantities and certain vaules arbitrarily placed in certain columns to cancel the base figures employed in obtaining the complements; that is, if 100 is used as the base and one complement falls in the right hand column, a value of nine is placed in the third column which, added to the one carried over from the 100, equals ten, transfers a one to the next column and leaves the third column unaffected by the base figure used in the first column.

We have found that several types of machines may be produced for carrying our invention into effect. For the purpose of illustration, we have shown and described a machine employing the formula given in the following table and in which the complements are substituted for negative quantities but we do not limit ourselves to the particular phase of the formula employed or to the specific machine illustrated and described.

The following table is the same as Table II except that the quantities in each column have been rearranged to conform to the positions of certain mechanisms in the machine presently to be described, the negative quantities replaced by their complements, and certain figures arbitrarily added into certain columns for canceling the base figures used.

*Table III*

| (F) | (E) | (D) | (C) | (B) | (A) |
|---|---|---|---|---|---|
| --- | --- | --- | $a$ $f$ | $b$ $g$ | $c$ $h$ |
| --- | $100-\frac{(a-f)^2}{4}$ $\frac{(a+f)^2}{4}$ | $100-\frac{(b-f)^2}{4}$ $\frac{(b+f)^2}{4}$ | $100-\frac{(c-f)^2}{4}$ $\frac{(c+f)^2}{4}$ | --- | --- |
| --- | --- | $100-\frac{(a-g)^2}{4}$ $\frac{(a+g)^2}{4}$ | $100-\frac{(b-g)^2}{4}$ $\frac{(b+g)^2}{4}$ | $100-\frac{(c-g)^2}{4}$ $\frac{(c+g)^2}{4}$ | --- |
| --- | --- | --- | $100-\frac{(a-h)^2}{4}$ $\frac{(a+h)^2}{4}$ | $100-\frac{(b-h)^2}{4}$ $\frac{(b+h)^2}{4}$ | $100-\frac{(c-h)^2}{4}$ $\frac{(c+h)^2}{4}$ |
| 7 | 6 | 7 | 9 | 0 | 0 |

When the amounts in each column are distributed, the base figure (100) added to column A will cause a 1 to fall in column C which, added to the 9 arbitrarily placed therein, equals 10 and causes a 1 to fall in column D. The two base figures added to column B will cause a 2 to fall in column D which, added to the 7 arbitrarily placed therein and to the 1 carried over from column C, equals 10 and causes a 1 to fall in column E. The three base figures added to column C cause a 3 to fall in column E which, added to the 6 arbitrarily placed therein and to the 1 carried over from column D, equals 10 and causes a 1 to fall in column F. The two base figures added to column D cause a 2 to fall in column F which, added to the 7 arbitrarily placed therein and to the 1 carried over from column E, causes a 1 to fall into the next column, if any, or out of the table or machine if but six columns or decimal places are employed. The base figure placed in column E will cause a 1 to fall in the column to the left of column F, if any, or out of the table or machine if but six columns or decimal places are employed.

As the values of the integers impressed upon the machine range from 0 to 9, the sum of two integers $(x+y)$ will range from 0 to 18, the quarter-squares of the sums $$\frac{(x+y)^2}{4}$$

range from 0 to 81, the differences between two integers $(x-y)$ range from 0 to 9, and the complements of the quarter-squares of the differences $$100-\frac{(x-y)^2}{4}$$

range from 80 to 100. In Tables I, II and III, the product of the two integers is shown in each column. In the machine, the value of the "units" figure of a product in any one column is distributed upon mechanism in the corresponding bank and the value of the "tens" figure, if any, upon mechanism in the next higher bank.

The units parts of the amounts shown in the several columns of Table III are indicated by (U) and shown in corresponding columns in Table IV, which is shown on the drawings as Figure 28, and the ten parts of those amounts shown in the next higher column and indicated by (T). The arbitrary figures added into the columns of Table III are omitted from Table IV as they are taken care of in the registering mechanism as will presently be described.

Both the units and tens parts of the various amounts are shown in boxes which represent converting units having a gear forming a part of each. The gear of each converting unit is indicated by its reference numeral and shows the integers which are transfixed to it by the distributing mechanism and whether the second integer is added to or subtracted from the first integer. Before describing the method further, mechanism for carrying it into effect will be described.

A machine embodying our invention consists of tabulating mechanism upon which the numbers to be multiplied are impressed, distributing mechanism which arranges the sums and differences of the several integers of the numbers to be multiplied, converting mechanism which receives the sums and differences from the distributing mechanism and converts the sums into their quarter-squares and the differences into the complements of their quarter-squares in accordance with Table III, all of which is divided into banks corresponding to the columns in Tables I to III, registering mechanism having means for causing an upper bank to register for every time the next lower bank has registered ten times and having dials upon which the final product is registered, and driving mechanism for actuating the other mechanisms.

For the sake of simplicity, tables have been given for three-place numbers only and a machine having but three banks of keys and six banks of mechanisms illustrated in the accompanying drawings as a machine of greater capacity may be produced by duplication of parts. Adding and subtracting mechanisms have not been shown as these functions are well known and it would merely be necessary to disconnect the distributing and converting mechanisms and connect the tabulating mechanism directly to the registering mechanism to produce these functions.

Referring to the drawings, in which several of the views show the parts which are in the immediate foreground only as the inclusion of the parts in the back ground would render these views so complicated that they would be unintelligible, Figure 1 is a longitudinal elevation of a machine in which our invention is embodied with the side of the casing removed;

Figure 2 a longitudinal section, taken through the center of the second bank of mechanism as indicated by line 2—2 on Figure 9, and Figure 3 a longitudinal section taken on line 3—3 on Figure 9.

Figure 9 is a transverse section taken on line 9—9 on Figure 1,

Figure 1:
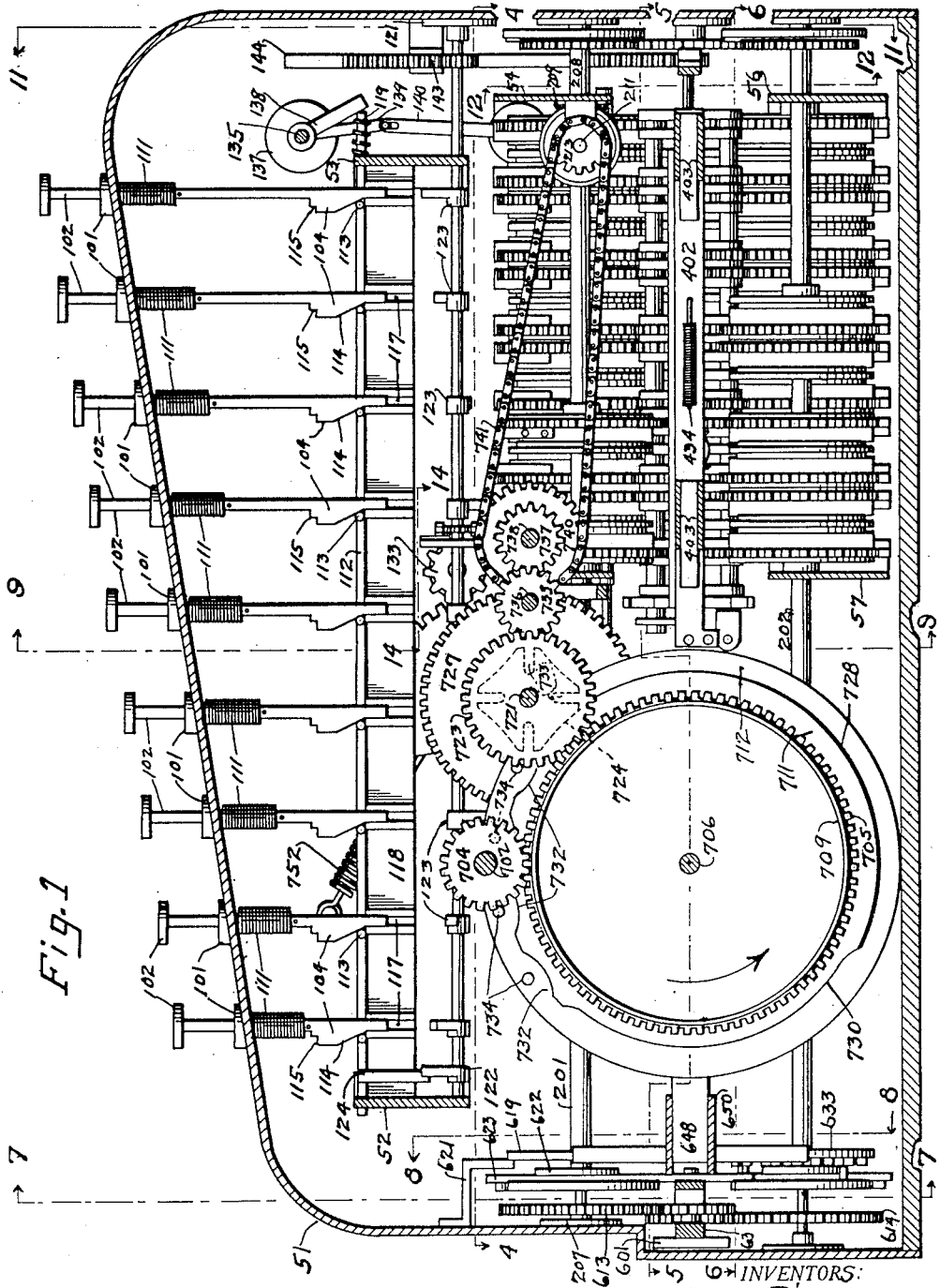
Figure 2:
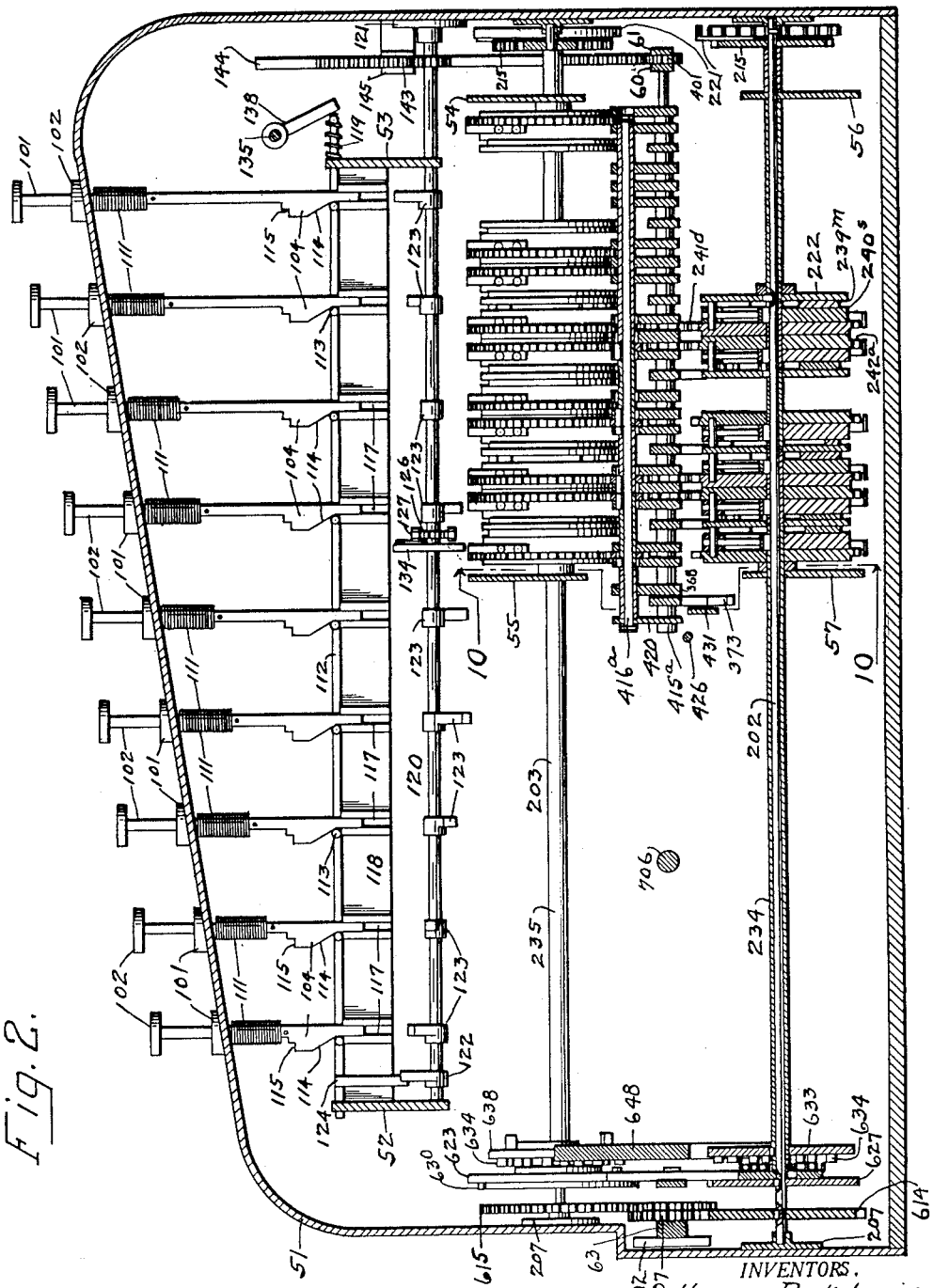
Figure 11:
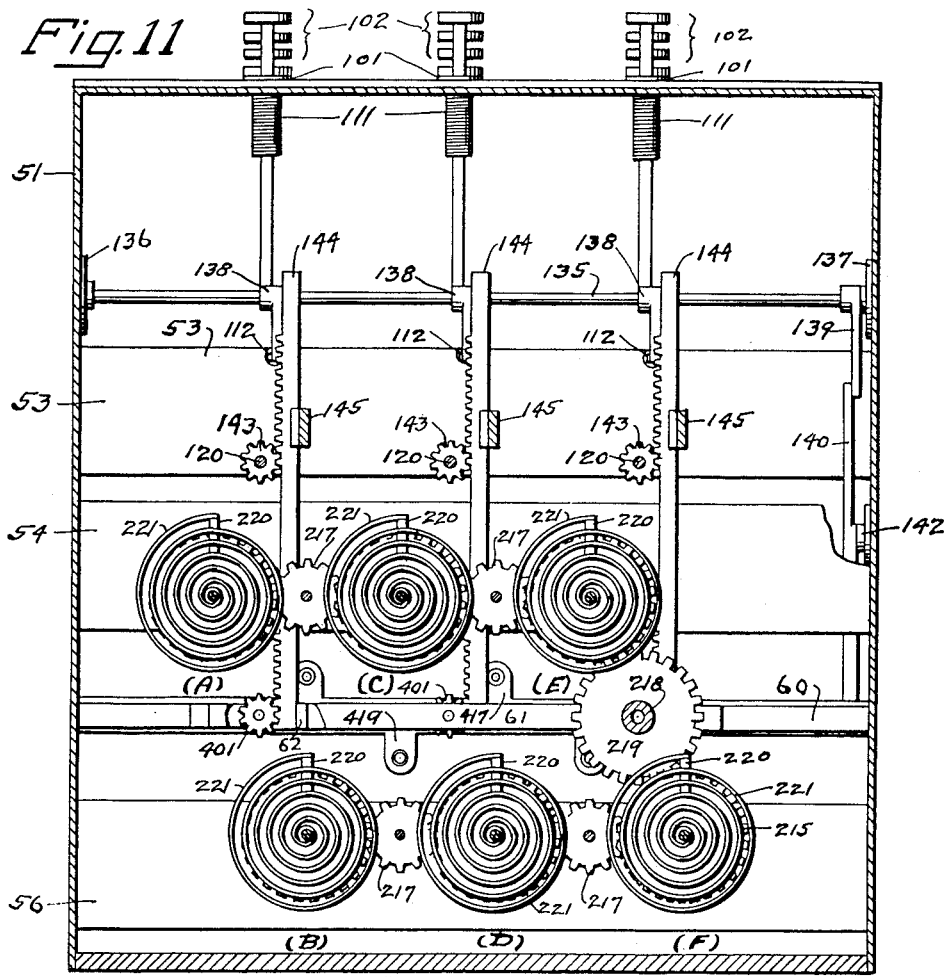

Figure 10 a fragmentary transverse section taken on the broken line 10—10 on Figure 2, and Figure 11 a transverse section showing the racks which drive the distributing mechanism, the springs and gears which drive the converting mechanism and the mechanism for clearing the tabulating mechanism; the view being taken in the plane of line 11—11 on Figure 1.

Figure 4:
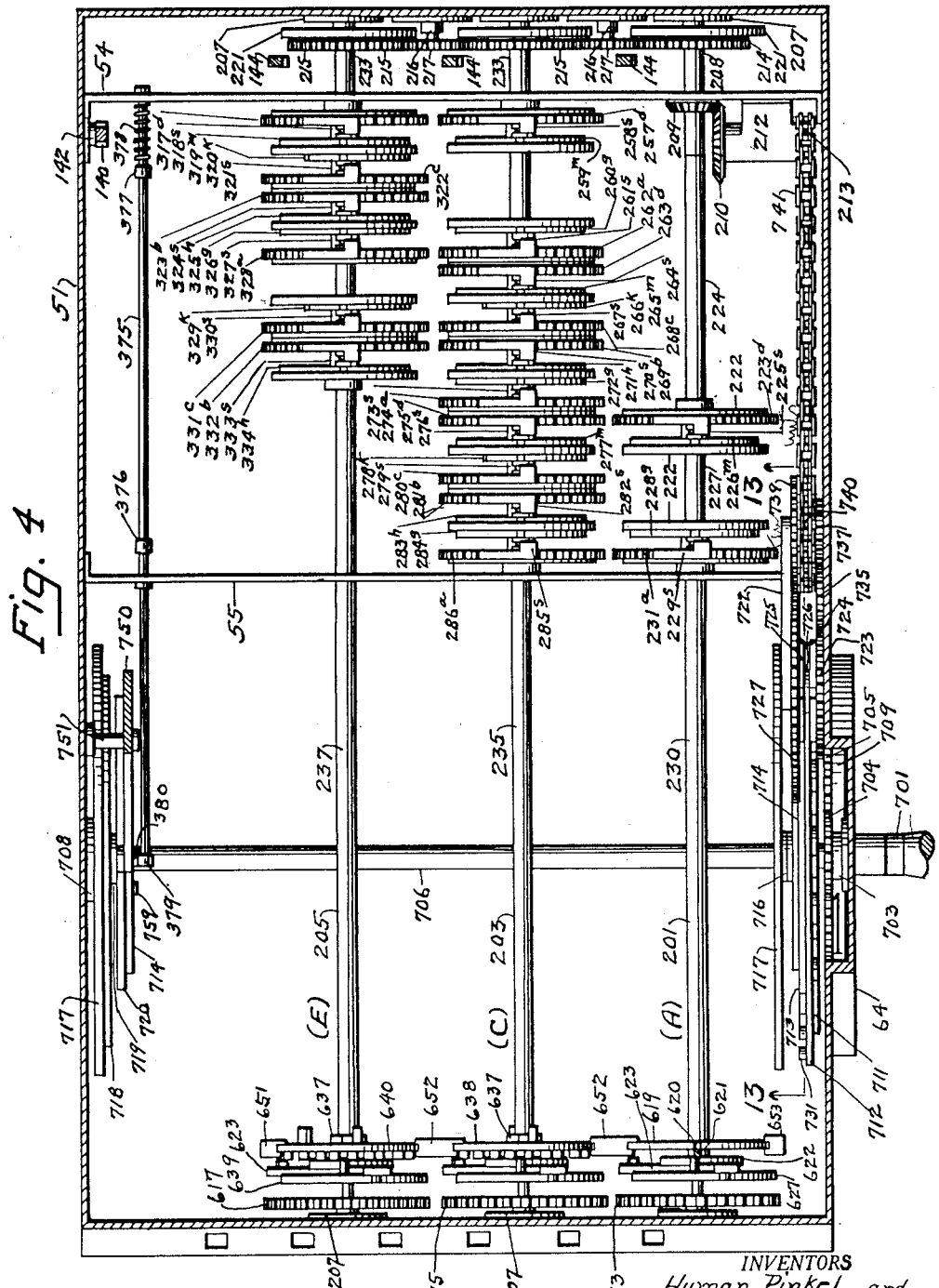
Figure 4 is a sectional plan view, taken substantially on line 4—4 on Figure 1, showing only the driving mechanism, the upper banks of the converting mechanism and the upper banks of the registering mechanism.
Figure 12:
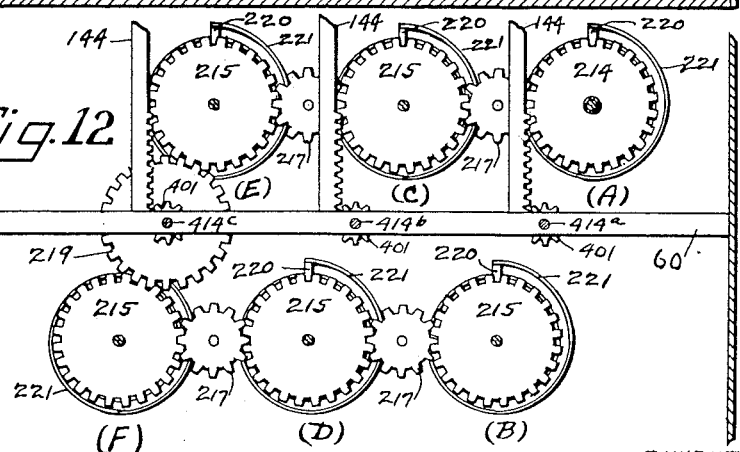

Figure 12 is a fragmentary transverse section, taken on line 12—12 on Figure 1, showing the gearing which connects the several banks of converting mechanism, Figure 13 a detail view, taken substantially on line 13—13 on Figure 4, showing certain details of the driving mechanism, Figure 14 a detail view, taken in the plane of line 14—14 on Figure 1, showing mechanism for driving the tabulating mechanism, and Figures 15 and 16, respectively, an elevation and a central section of an arm forming a part of the converting mechanism.

Figures 17, 19, 21, 22 and 24 are detail views of gears forming parts of the converting mechanism, and Figures 18, 20, 23 and 25 detail views of stop plates forming parts of the converting mechanism.

Figure 5:
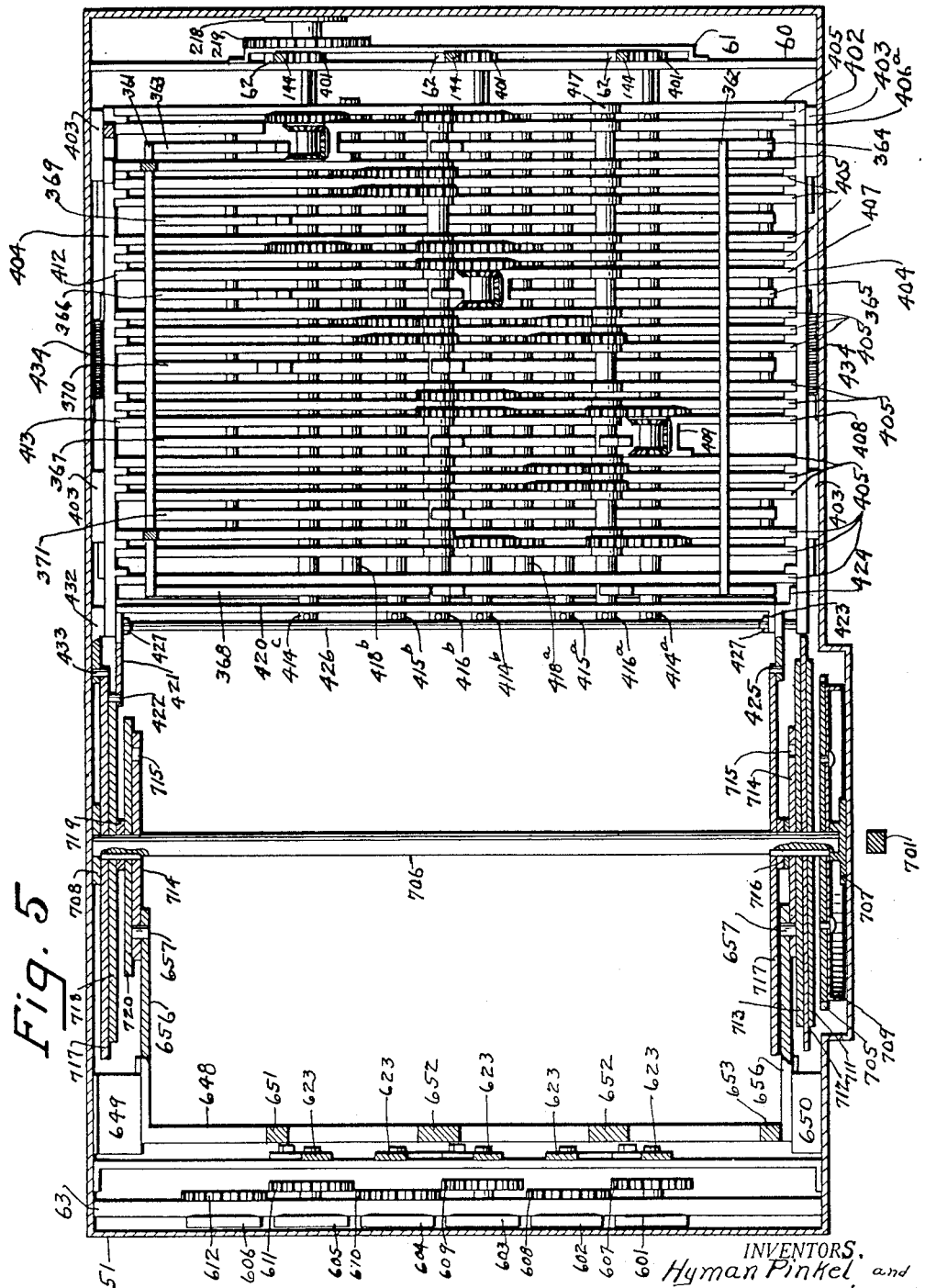
Figure 5 is a sectional plan view, taken substantially on the broken line 5—5 on Figure 1, showing the distributing mechanism and certain clearing mechanism in full, the driving mechanism in central section, and certain parts of the registering mechanism.

Figure 26 is a schematic sectional plan view of the distributing mechanism shown in Figure 5 but drawn to a larger scale and with certain parts broken away and other parts omitted.

Figure 27 is a view similar to Figure 26 but with the parts shown in different positions.

Figure 28:
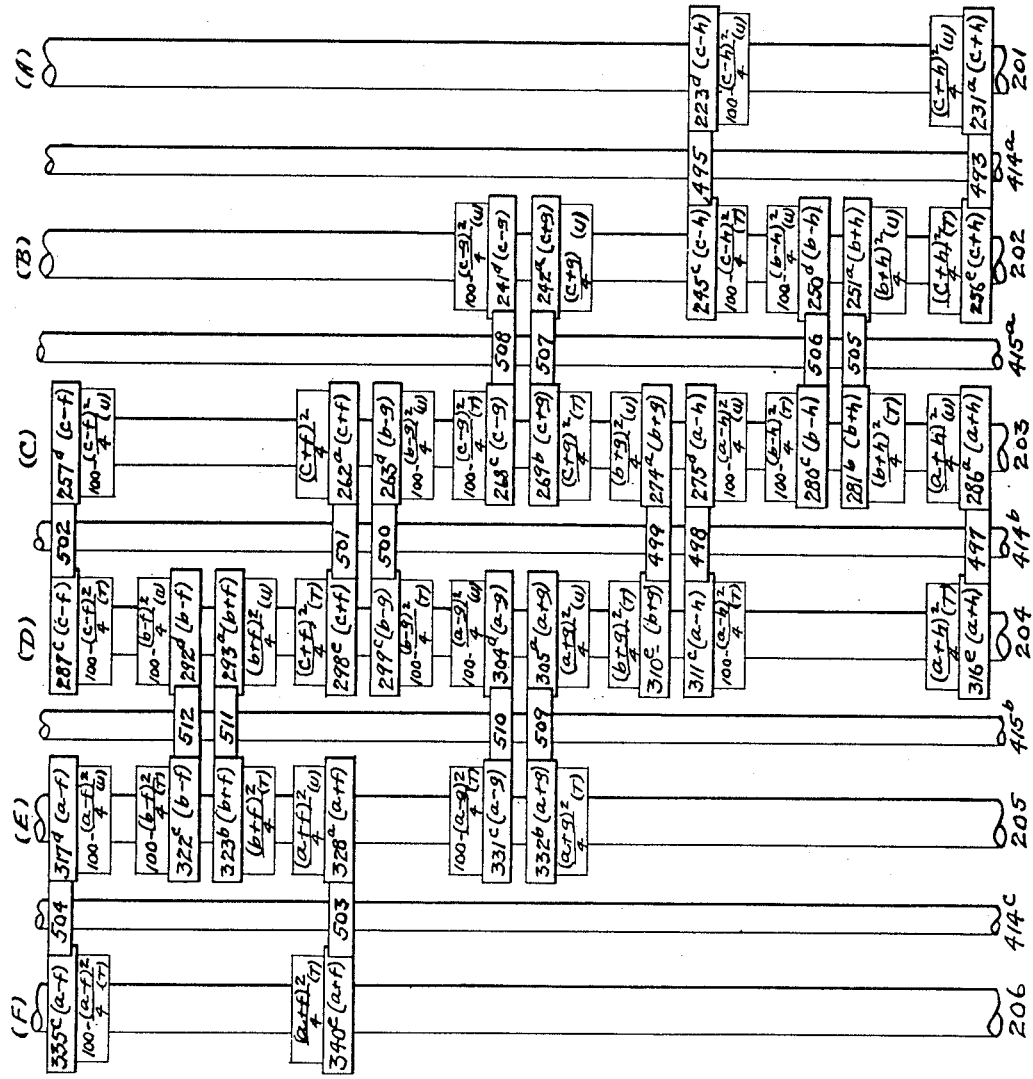

Figure 28 is a diagram showing, schematically, the gears of the converting mechanism and the gears of the distributing mechanism which mesh with them and also showing the amount received by each converting gear and, in a box attached to each gear, the quarter-square of that amount or its complement.

As the banks of mechanisms correspond to the columns in Tables I to III, they have been designated A, B, C, D, E and F to correspond with the similarly designated columns in the tables. In order that the elements of one part of the machine may be readily distinguished from those of other parts of the machine, reference numerals under 100 have been applied to the casing parts, numerals between 100 and 199 to the tabulating mechanism, numerals between 200 and 399 to the converting mechanism, numerals between 400 and 599 to the distributing mechanism, numerals between 600 and 699 to the registering mechanism, and numerals between 700 and 799 to the driving mechanism.

Referring now more particularly to Figures 1, 2 and 9, the mechanisms are mounted in a casing 51 having key guides 101 arranged in three rows of nine each in its upper wall. Slidably mounted in each row of guides are keys 102 which differ only in the lengths of their shanks and in the figures displayed upon their tops. The keys are held in their upper positions by springs 111 which may be tension springs and have one end of each secured to a key guide or the wall of the casing and the other end to the shank of the key.

Struts 52 and 53 extend transversely of the casing and slidably support three keybars 112, each of which is mounted adjacent a row of keys and has nine pins or projections 113 extending from one side and abutting the sloping faces 114 on enlargements 104 formed near the lower ends of the keys ad having stops 115 on their upper edges. In order to hold each key in alignment when it is depressed to force face 114 across pin 113, a projection or pin 116 is formed on or secured in its lower end and slidably mounted in a guideway 117 formed on a guide bar 118 supported between struts 52 and 53. Each keybar is non-rotatable and held in its operative position, as shown in Figures 1 and 2, by a coil spring 119 encircling its rear end and abutting strut 53.

Beneath each bank of keys, a shaft 120 is rotatably mounted in struts 52 and 53 and in a bearing 121 secured to the rear wall of the casing. Spaced progressively one-tenth of a revolution apart around the shaft and rigidly secured thereto are ten arms 122 and 123, the nine arms 123 being in alignment with the nine keys and the arm 122 in alignment with and normally abutting an arm 124 fixed on keybar 112. Arm 122 represents the zero position and holds shaft 120 against rotation unless one of the keys is depressed, causing the face 114 on that key to move along the pin 113 with which it is in contact and move keybar 112 against the action of spring 119 sufficiently for arm 124 to clear arm 122.

Shaft 120 may then rotate until the arm beneath the depressed key comes in contact with the lower end of that key. When the key is fully depressed, spring 119 will draw the keybar rearwardly and cause the pin 113, which is in contact with that key, to ride onto the top of enlargement 104 and against stop 115, thus holding the key against upward movement and the keybar from returning sufficiently to bring arm 124 in alignment with arm 122. When arm 124 is in contact with arm 122, shaft 120 is held against rotation; when the number one key is depressed, shaft 120 may make one-tenth of a revolution; when the number two key is depressed, the shaft may make two-tenths of a revolution, etc.

Figure 3:
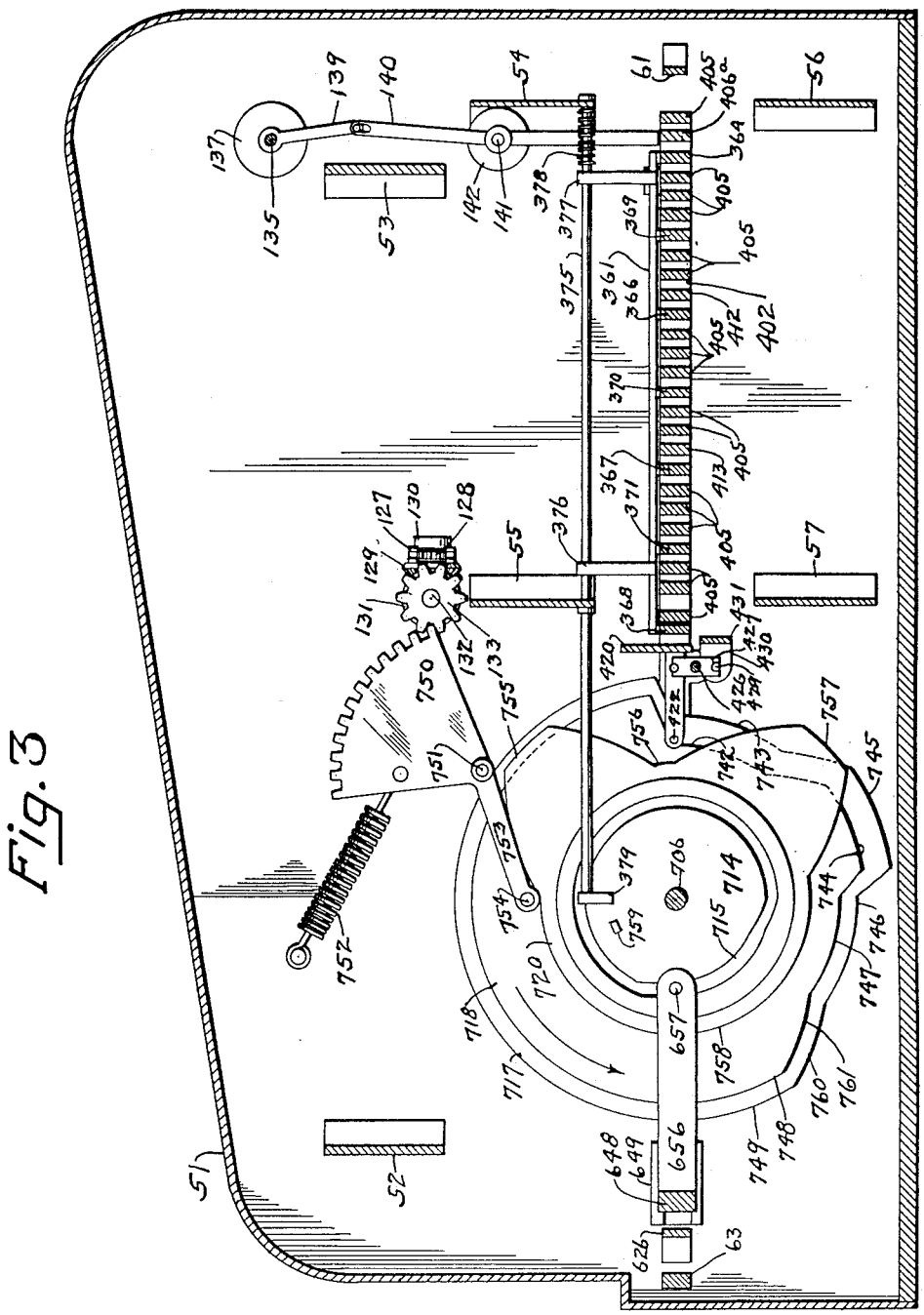

A sprocket gear 126 is rotatably mounted on each shaft 120 and driven by a chain 127 which is actuated by a sprocket gear 128 fixed for rotation with a bevel gear 129 and rotatably mounted in a bracket bearing 130 secured to the side wall of the casing (see also Figures 3 and 14). A bevel gear 131 is rotatably mounted on a stub shaft 132 on bearing 130 and meshes with bevel gear 129. A spur gear 133, also mounted on shaft 132, is fixed for rotation with gear 131, and meshes with a segmental gear 750 forming a part of the driving mechanism.

Sprocket gears 126 are each connected to a shaft 120 by means of a spiral spring 134 which has one end secured to the gear and the other end to the shaft. When a key is depressed and segmental gear 750 is actuated, gears 133, 131, 129, and 128 will be rotated, chain 127 driven and gears 126 rotated, thus rotating each shaft 120 through the connection of spring 134 until an arm 123 abuts the end of the depressed key, after which spring 134 permits gear 126 to complete its revolution.

A shaft 135, rockably mounted in bearings 136 and 137 fixed to the side walls of the casing, has an arm 138 abutting the end of each keybar 112 for forcing the same forwardly against the action of spring 119 in order to move pins 113 clear of enlargements 104 and allow any key that may be depressed to be returned by its spring 111 (see also Figure 11). A lever 139 has one end fixed on shaft 135 and its other end hinged to a lever 140 mounted intermediate its ends on a stub shaft 141 formed on a bearing 142 which is fixed to the side wall of the casing. When the distributing mechanism is shifted, as will be presently described, it engages the lower end of lever 140 and swings it, causing lever 139 and shaft 135 to be rocked, keybars 112 forced forwardly, and the keys released.

Rotation of each shaft 120 is transferred to the distributing mechanism through a gear 143 fixed on the shaft and meshing with a rack 144 which has its upper end slidably mounted in a guide 145 and its lower end in mesh with a gear 401 which forms a part of the distributing mechanism.

Figure 6:
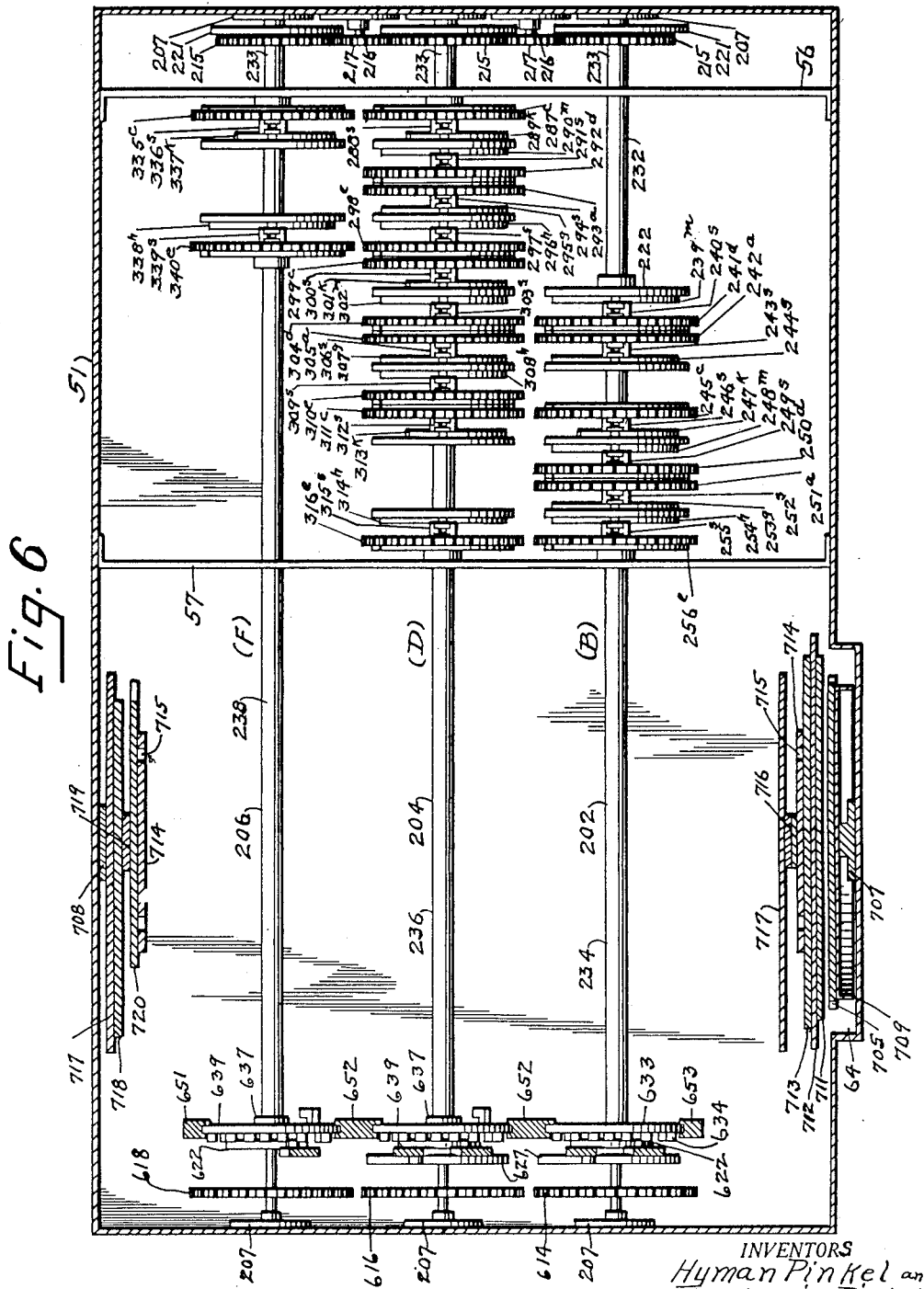
Figure 6 is a sectional plan view, taken substantially on line 6—6 on Figure 1, showing only the lower banks of the converting mechanism, the lower banks of the registering mechanism and sections of certain parts of the driving mechanism.

Referring now also to the other views, the principal parts of the converting and recording mechanisms are mounted upon six shafts indicated by reference numerals 201, 202, 203, 204, 205 and 206 which correspond to columns A, B, C, D, E and F, respectively, in Tables I to III. The shafts are arranged in two tiers and rotatably mounted in bearings 207 secured to the end walls of the casing; shafts 201, 203 and 205, which are shown in Figure 4, being disposed above the distributing mechanism and shafts 202, 204 and 206, which are shown in Figure 6, being disposed below the distributing mechanism.

A strut 54 extends transversely of the casing and supports shafts 201, 203 and 205 adjacent their rear ends and a strut 55 extends transversely of the casing and supports these shafts between the converting and recording mechanisms. Struts 56 and 57 extend transversely of the casing below struts 54 and 55, respectively, and similarly support shafts 202, 204 and 206.

A sleeve 208, rotatably mounted upon the rear end of shaft 201, has a bevel gear 209 fixed on one end and meshing with a bevel gear 210 fixed on one end of a shaft 211 rotatably mounted in a bearing 212 and having a sprocket gear 213 fixed on its other end and engaged by a chain 741 forming a part of the driving mechanism. A gear 214 is fixed on the other end of sleeve 208 and similar gears 215 are rotatably mounted upon the rear ends of shafts 202 to 206 inclusive.

A bearing 216 is mounted on the rear wall of the casing between shafts 201 and 203 and rotatably supports an idler gear 217 which meshes with gear 214 and with the gear 215 on shaft 203. Similar bearings 216 are mounted between shafts 203 and 205, 202 and 204, and 204 and 206 and rotatably support idler gears 217 which mesh with the gears 215 on adjacent shafts, as best shown in Figure 12. A hollow bearing 218 is secured to the rear wall of the casing and rotatably supports an idler gear 219 which meshes with the gear 215 on shaft 205 and with the gear 215 on shaft 206. When the driving mechanism is actuated to rotate sprocket wheel 213, gears 214 and 215 will be rotated equally.

An arm 220 is secured to each of gears 214 and 215 and has one end of a spiral spring 221 secured to its outer end, the other end of the spring being secured to the shaft upon which the gear is mounted, as best shown in Figure 11. When gears 214 and 215 are rotated, springs 221 will be wound up and rotate the shafts until they are stopped by certain parts of the converting mechanism as will presently be described.

The converting mechanism on each of the shafts consists of from two to ten converting units and each unit consists of a gear, an arm and a stop plate. The arms, shown in detail in Figures 15 and 16 and marked $s$, are all alike except for the manner in which they are mounted upon the shafts and sleeves, as shown in Figures 17 to 25. There are five kinds of gears and four kinds of stop plates; the different kinds of gears being lettered $a$, $b$, $c$, $d$ and $e$ and the different kinds of stop plates $g$, $h$, $k$ and $m$, respectively. In order to clearly explain the functions of the machine, each arm, gear and stop plate has been given a separate reference numeral to which has been added the letter indicating its kind as an exponent. For example, gears $231^a$ and $328^a$ are alike but are mounted in different locations and adapted to receive different combinations of integers. In order that the stop plates may be mounted upon the shafts, each is secured to a disk 222 and, as the stop plates are sometimes adjacent one another and sometimes spaced apart, a disk 222 may have a stop plate on either side or upon both sides.

Shafts 201 to 206 have sleeves rotatably mounted upon them and, in each converting unit, the gear is rotatably mounted while either the arm or the stop plate may be fixed for rotation with a shaft or a sleeve. The arms and stop plates coact to stop rotation of the shaft, therefore, either the arm or the stop plate may be considered as a stopping element.

The forwardmost stopping element on each shaft is fixed for rotation with a sleeve which is connected to the registering mechanism; the rearmost stopping element on each shaft is fixed for rotation with the shaft; the stopping element next to the rearmost stopping element is fixed for rotation with the following stopping element; the next stopping element, if any, is fixed for rotation with the following stopping element, and succeeding stopping elements, if any, are similarly arranged. The stopping elements, which are fixed for rotation with each other, are both fixed to the same sleeve which is rotatable on the shaft. The short sleeves, which connect two stopping elements, have not been described as this method of connecting two parts on a shaft is well known. A typical arrangement is shown in Figure 2 in which the second bank of converting mechanism is shown in central section.

In the first bank of converting mechanism, shaft 201 has a gear $223^d$ rotatably mounted upon it and spaced from sleeve 208 by a sleeve 224. An arm $225^s$ is fixed to the shaft between gear $223^d$ and a stop plate $226^m$ secured to a disk 222 which is fixed on one end of a sleeve 227 rotatably mounted upon the shaft. A second disk 222 is fixed on the other end of sleeve 227 and carries a stop plate $228^g$ which coacts with an arm $229^s$ fixed on the rear end of a sleeve 230 whose forward end is secured to a part of the registering mechanism. A gear $231^a$, rotatably mounted on sleeve 230, coacts with arm $229^s$ and is held in engagement therewith by strut 55.

Shafts 202, 203, 204, 205 and 206 have sleeves 233 rotatably mounted upon their rear ends, for spacing gears 215 from struts 54 and 56, and sleeves 234, 235, 236, 237 and 238, respectively, rotatably mounted on their forward ends and connected to the registering mechanism.

In the second bank of converting mechanism, a disk 222 is fixed to shaft 202, spaced from strut 56 by a sleeve 232, carries a stop plate 239$^m$ followed successively by an arm 240$^s$, a gear 241$^c$, a gear 242$^a$, an arm 243$^s$, a stop plate 244$^g$, a gear 245$^c$, an arm 246$^s$, a stop plate 247$^k$, a stop plate 248$^m$, an arm 249$^s$, a gear 250$^d$, a gear 251$^a$, an arm 252$^s$, a stop plate 253$^g$, a stop plate 254$^h$, an arm 255$^s$, a gear 256$^e$; arm 255$^s$ being fixed for rotation with sleeve 234 and the stop plate being fixed to disks 222.

In the third bank of converting mechanism, a gear 257$^d$ is rotatably mounted upon shaft 203 and followed by an arm 258$^s$ which is fixed to the shaft and followed successively by a stop plate 259$^m$, a stop plate 260$^g$, an arm 261$^s$, a gear 262$^a$, a gear 263$^d$, an arm 264$^s$, a stop plate 265$^m$, a stop plate 266$^k$, an arm 267$^s$, a gear 268$^c$, a gear 269$^b$, an arm 270$^s$, a stop plate 271$^h$, a stop plate 272$^g$, an arm 273$^s$, a gear 274$^a$, a gear 275$^d$, an arm 276$^s$, a stop plate 277$^m$, a stop plate 278$^k$, an arm 279$^s$, a gear 280$^c$, a gear 281$^b$, an arm 282$^s$, a stop plate 283$^h$, a stop plate 284$^g$, an arm 285$^s$, and a gear 286$^a$; arm 285$^s$ being fixed to sleeve 235 and gear 286$^a$ being rotatable upon the sleeve and abutting strut 55.

In the fourth bank of converting mechanism, a gear 287$^c$ is rotatably mounted upon shaft 204 and followed by an arm 288$^s$ which is fixed to the shaft and followed successively by a stop plate 289$^k$, a stop plate 290$^m$, an arm 291$^s$, a gear 292$^d$, a gear 293$^a$, an arm 294$^s$, a stop plate 295$^g$, a stop plate 296$^h$, an arm 297$^s$, a gear 298$^e$, a gear 299$^c$, an arm 300$^s$, a stop plate 301$^k$, a stop plate 302$^m$, an arm 303$^s$, a gear 304$^d$, a gear 305$^a$, an arm 306$^s$, a stop plate 307$^g$, a stop plate 308$^h$, an arm 309$^s$, a gear 310$^e$, a gear 311$^c$, an arm 312$^s$, a stop plate 313$^k$, a stop plate 314$^h$, an arm 315$^s$, and a gear 316$^e$; arm 315$^s$ being fixed for rotation with sleeve 236 and gear 316$^e$ being rotatable upon the sleeve and abutting strut 57.

In the fifth bank of converting mechanism, a gear 317$^d$ is rotatably mounted upon shaft 205 and an arm 318$^s$ fixed to the shaft adjacent this gear and followed successively by a stop plate 319$^m$, a stop plate 320$^k$, an arm 321$^s$, a gear 322$^c$, a gear 323$^b$, an arm 324$^s$, a stop plate 325$^h$, a stop plate 326$^g$, an arm 327$^s$, a gear 328$^a$, a stop plate 329$^k$, an arm 330$^s$, a gear 331$^c$, a gear 332$^b$, an arm 333$^s$ and a stop plate 334$^h$ which is fixed for rotation with sleeve 237.

In the sixth bank of converting mechanism, a gear 335$^c$ is rotatably mounted upon shaft 206, an arm 336$^s$ fixed to the shaft adjacent the gear and successively followed by a stop plate 337$^k$, a stop plate 338$^h$, an arm 339$^s$, and a gear 340$^e$; gear 340$^e$ being rotatable on sleeve 238 and arm 329$^s$ being fixed for rotation with the sleeve.

Referring now more particularly to Figures 15 and 16, the arm "$s$" consists of a body part 350 adapted to be fixed for rotation with a shaft or a sleeve, as by inserting a key in the keyway 351. A guideway 352 extends inwardly from one end and has a tongue 353 extending the entire length of each of its sides. A slider 354 is mounted in the guideway and provided with grooves in its edges for receiving tongues 353 so that it is free to slide longitudinally of the guideway but is held against movement transversely thereof. A pin 358 is fixed in the slide and extends from each of its sides so that one of its ends may slide in a cam groove in a converting gear and the other engage the stops on the stop plates. A leaf spring 356 has one end secured to the side of the arm and the other end curved to approximately the radius of the converting gears and provided with a projection or offset 357 for engaging the teeth of the gear with which the arm to which it is secured is associated. The leaf spring tends to prevent movement of the converting gear, relatively to the arm, when the gear is not being driven by a gear in the distributing mechanism or the arm being swung during the clearing and resetting processes.

Figure 24:
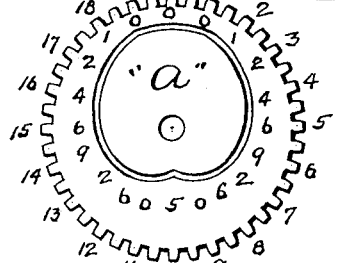

The converting gears shown on Sheet 11 of the drawings are all alike except for the cam groove formed in one face of each. Gear "$a$", shown in Figure 24, is adapted to receive the sum of two integers $(x+y)$ and to coact with stop plate "$g$", shown in Figure 25, for producing the units part of the quarter-square of that sum $$\frac{(x+y^2)}{4}.$$

Figure 19:
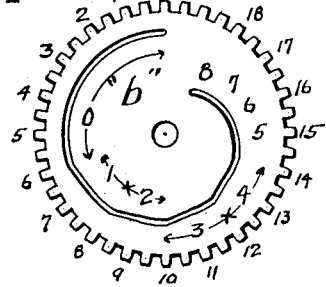
Figure 20:
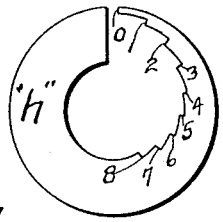

Gear "$b$", shown in Figure 19, is adapted to receive the same sum as gear "$a$" and to coact with stop plate "$h$", shown in Figure 20, for producing the tens part of the quarter-square of that sum.

Figure 17:
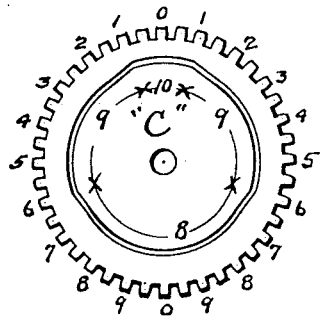
Figure 22:
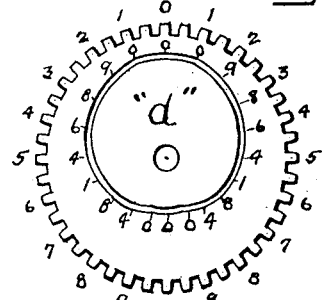
Figure 18:
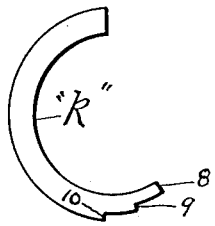
Figure 23:
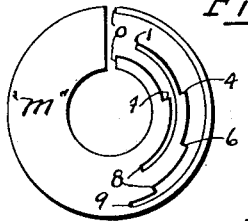

Gear "$d$", shown in Figure 22, is adapted to receive the difference between two integers $(x-y)$ and to coact with stop plate "$m$", shown in Figure 23, for producing the units part of the complement of that difference. Gear "$c$", shown in Figure 17, is adapted to receive the same amount as gear "$d$" and to coact with stop plate "$k$", as shown in Figure 19, for producing the tens part of that complement.

Figure 21:
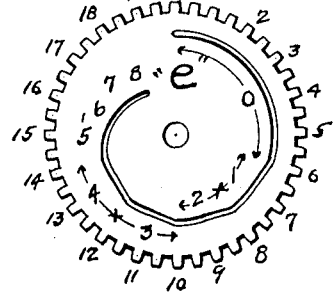

Gears "$a$", "$c$" and "$d$" have cam grooves which are symmetrical about their vertical diameters, relatively to the positions shown in the drawings, and can be faced in either direction upon a shaft, but gear "$b$" has a cam groove which renders it unsymmetrical so that it can be faced in but one direction on a shaft, consequently, gear "$e$", which is exactly opposite hand to gear "$b$", and shown in Figure 21 is provided.

Before describing the gears and stop plates in detail, the values of all possible combinations of $$\frac{(x+y)^2}{4}$$

and $$\frac{(x-y)^2}{4}$$

will be considered. The smallest value of $(x+y)$ is zero and the greatest possible value is 18 while the smallest value of $(x-y)$ is zero and the greatest possible value is 9. If the value of $$\frac{(x+y)^2}{4}$$

or $$100 - \frac{(x-y)^2}{4}$$

amounts to more than 9, the units part of it must be placed in one bank of mechanism and the tens part in the adjoining bank. The following tables show all possible values of $$\frac{(x+y)^2}{4}$$

and $$100 - \frac{(x-y)^2}{4}$$

and the amounts to be placed in the units and the tens columns in each case.

Table V

| $(x+y)$ | $\frac{(x+y)^2}{4}$ | Tens | Units |
|---|---|---|---|
| 0 | 0 | 0 | 0 |
| 1 | 0 | 0 | 0 |
| 2 | 1 | 0 | 1 |
| 3 | 2 | 0 | 2 |
| 4 | 4 | 0 | 4 |
| 5 | 6 | 0 | 6 |
| 6 | 9 | 0 | 9 |
| 7 | 12 | 1 | 2 |
| 8 | 16 | 1 | 6 |
| 9 | 20 | 2 | 0 |
| 10 | 25 | 2 | 5 |
| 11 | 30 | 3 | 0 |
| 12 | 36 | 3 | 6 |
| 13 | 42 | 4 | 2 |
| 14 | 49 | 4 | 9 |
| 15 | 56 | 5 | 6 |
| 16 | 64 | 6 | 4 |
| 17 | 72 | 7 | 2 |
| 18 | 81 | 8 | 1 |

Table VI

| $(x-y)$ | $100-\frac{(x-y)^2}{4}$ | Tens | Units |
|---|---|---|---|
| 0 | 100 | 10 | 0 |
| 1 | 100 | 10 | 0 |
| 2 | 99 | 9 | 9 |
| 3 | 98 | 9 | 8 |
| 4 | 96 | 9 | 6 |
| 5 | 94 | 9 | 4 |
| 6 | 91 | 9 | 1 |
| 7 | 88 | 8 | 8 |
| 8 | 84 | 8 | 4 |
| 9 | 80 | 8 | 0 |

Figure 25:
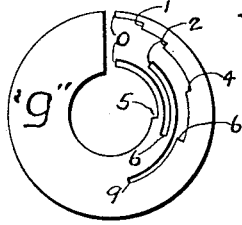

As previously stated, gear "a", shown in Figure 24, and stop plate "g", shown in Figure 25, coact with an arm "s" to produce the units part of the quarter-square of the sum of any two integers or the amounts shown in the right hand column of Table V. It will be noted that the units part of the quarter-square of 10 is 5 and that the figures above the 5 are the same as those in the same relative positions below the 5. That is, the right hand column of figures in Table V is symmetrical about the 5 from the sum of 2 to the sum of 18. It therefore follows that stop plate "g" needs but ten stops, each of which is spaced from the zero position the number of twentieths of a revolution shown by the corresponding amount in the units column of Table V.

When gear "a" is rotated, its cam groove is adapted to move the pin 358 in arm "s" into alignment with the stop on stop plate "g" corresponding to the units part of the quarter-square of the amount which the gear is rotated. That is, if the gear is rotated an amount equal to 5, or 5/20 of a revolution, its cam groove will move pin 358 into alignment with the stop marked 6 on stop plate "g".

As stop plate "g" has but ten stops, the cam groove in gear "a" must move from the zero position toward the center of the gear one step at a time during one half a revolution and move outwardly one step at a time during the following 8/20 of a revolution. In order to make the gear fully symmetrical about its vertical diameter, the cam groove is continued from the 18 position to the zero position opposite hand to the cam groove from the zero position to the 2 position. In the drawings, the amounts that the gear may receive, or the number of twentieths of a rotation that may be imparted to it, are marked adjacent the gear teeth and the several parts of the cam groove are given the same figures as the stops with which they will align a pin 358.

Gear "b", shown in Figure 19, is adapted to to be rotated at the same time and the same amount as gear "a" for producing, in conjunction with the stop plate "h" shown in Figure 20, the tens part of the quarter-square of the sum of the integers transferred to these gears, as shown in the "tens" column in Table V. It will be noted that this column is not symmetrical and, therefore the cam groove in gear "b" is not symmetrical. For this reason, a gear "c" is shown in Figure 21 which is opposite hand to gear "b" and will not be described as a description of one is a description of both.

Stop plate "h" has nine stops, marked from 0 to 8 to correspond with the amounts in the tens column in Table V. Gear "b" has a cam groove so arranged that it will move a pin 358 in an arm "s" toward the center of the gear to correspond with the changes in the tens column so as to bring it into alignment with the stop representing the tens part of the amount which the gear has been rotated. That is, during the first 6/20 of a revolution, the pin will remain stationary in the arm "s". During the next 1/20 of a revolution, the pin will be moved inwardly one step to bring it into alignment with the stop marked 1 and remain in this position during the following 1/20 of a revolution, continuing to be moved inwardly, according to the changes in this column, as the gear is rotated.

Gear "d", shown in Figure 22, and stop plate "m", shown in Figure 23, coacts with an arm "s" to produce the units part of the complement of the quarter-square of the difference between any two integers, or the amounts shown in the right hand column of Table VI. Gear "c", shown in Figure 17, and stop plate "k", shown in Figure 18, coact with an arm "s" to produce the tens parts of the complements produced by gear "d" and stop plate "m" or the amounts shown in the tens column of Table VI.

Stop plate "m" has nine stops corresponding to the amounts shown in the units column of Table VI, each stop being marked with the amount which it represents. As the amounts in this column, from the 2 to the 9 positions, are each different from the preceding one, gear "d" has a cam groove which is concentric for the first 1/20 revolution, then moves inwardly a step at a time during the next 8/20 of a revolution and remains concentric for balance of the half revolution. As this gear may rotate in either direction, the other half of the cam groove is opposite hand to the one just described. The teeth of the gear are marked with the amounts which the gear receives ($x$ or $x-y$) and the several parts of the cam groove are marked with numbers similar to those on the stops with which they bring a pin 358 in alignment.

Stop plate "k" has three stops, 10, 9 and 8, corresponding to similar amounts in the tens column of Table VI and gear "c" has a cam groove each half of which is divided into three parts, marked 10, 9 and 8, respectively, which are adapted to position a pin in alignment with the corresponding stops, as previously described. The gear is fully symmetrical about its vertical diameter and may be faced in either direction on a shaft or rotated in either direction.

For the purpose of illustration let us assume that $x=6$ and $y=4$. Gear "d" will be rotated in one direction 6/20 of a revolution and then in the opposite direction 4/20 of a revolution, or a total of 2/20 of a revolution, so that pin 358 is disposed opposite the "2" tooth on the gear and in the "9" part of the cam slot. When in this position, it has been moved one step toward the center of the gear and is in alignment with the 9 stop on stop plate "m" as 100 minus the quarter-square of 2 is 99. Should the first integer placed upon a gear be greater than the second integer, the result would be the same as, in the above instance, gear "d" would be rotated 4/20 of a revolution in one direction and then 6/20 of a revolution in the opposite direction, thus bringing pin 358 opposite the "2" tooth on the opposite half of the gear.

Gear "c" will be rotated simultaneously with and the same amount as gear "d" or 2/20 of a revolution, bringing the pin 358 into the "9" part of the cam slot and opposite the "9" stop. When the machine is actuated, the arms coacting with gears "d" and "c" will each turn 9/20 of a revolution and produce an amount of 99 which is the complement required or $$100-\frac{(6-4)^2}{4}.$$

As certain parts, which stop the converting gears in their zero positions when the converting mechanism is reset, are supported by the distributing mechanism, a description of that mechanism will now be given.

The distributing mechanism is mounted in a frame 402 slidably mounted in guides 403 two of which are secured to each side wall of the casing. The frame consists of two side bars 404, which are slidably mounted in guides 403; 17 cross-bars 405, which have their ends rigidly secured to the side bars; three cross-bars 406, 407 and 408, which have one end of each secured to a side bar and the other end 409 bent into U-shape for supporting a stub shaft 410 upon which a mitre gear 411 is rotatably mounted; and two cross-bars 412 and 413, which have one end of each secured to a side bar in alignment with bars 407 and 408, respectively, and its free end suitably secured to an adjacent bar 405.

Three shafts $414^a$, $414^b$, and $414^c$ are rotatably mounted in bars 405 and in those bars 406, 407, 412 and 413 which they may intercept (see Figure 5). A strut 60 extends transversely of the casing and has a U-shaped strap 61 secured to it to form a space in which gears 401 are mounted and through which the lower ends of racks 144 extend, the racks being held in mesh with gears 401 by blocks 62 secured between the strut and the strap.

The rear ends of shafts 414 extend through gears 401 and are slidably keyed thereto (see Figures 26 and 27). Two shafts $415^a$ and $415^b$ are disposed intermediate shafts 414 and in the same plane therewith and provided with sleeves which are rotatably mounted in the cross-bars. Two shafts $416^a$ and $416^b$ are disposed, respectively, intermediate shafts $414^a$ and $415^a$ and shafts $414^b$ and $415^b$, but in a plane above them, and provided with sleeves which are rotatably mounted in ears 417 formed on the upper edges of the cross-bars. Two shafts $418^a$ and $418^b$ are disposed, respectively, intermediate shafts $415^a$ and $414^b$ and shafts $415^b$ and $414^c$ but in a plane below them and are provided with sleeves which are rotatably mounted in ears 419 formed on the lower edges of the cross-bars.

The forward ends of shafts 414, 415 and 416 support a shifter 420 whose left hand end is bent at right angles to form an arm 421 and carries a pin 422 contacting with the cam 718 of the driving mechanism. The right hand end 423 of shifter 420 is bent at right angles and abuts a lub 424 which is secured to side bar 404. The free end of the lug carries a pin 425 which engages a cam 717 forming a part of the driving mechanism. A shaft 426, having its ends rotatably mounted in side bars 404, has an arm 427 secured to each end adjacent the ends of the shifter and one end of each arm engages a pin 428 fixed in each of ends 421 and 423. The other ends of the arms engages pins 429 secured in the ends 430 of a shifter 431 supported on the forward ends of shafts 418.

A lug 432 is secured to the left hand side bar and carries a pin 433 which abuts a cam 717 forming a part of the driving mechanism. When pins 425 and 433 are moved by the action of cams 717, the entire frame slides rearwardly in guides 403 against the action of coil springs 434 which have one end of each secured to the frame and the other end to the casing. When pin 422 is thrust rearwardly, relatively to the frame, by cam 718, pins 428 will rock arms 427 and move shifter 431 in the opposite direction to shifter 420, as will be presently described. Collars 435 are secured on the front ends of the shafts and abut the front faces of the shifters and the sleeves on the shafts abut the rear faces of the shifters. Collars 436 are fixed to shafts 414, 415, 416 and 418 and abut the rear ends of the sleeves mounted upon them.

Shaft 414$^a$, which is disposed between the first and second banks of converting mechanisms, has a sleeve 437 rotatably mounted on its forward end and abutting shifter 420, a sleeve 438 secured to it and abutting sleeve 437, and a sleeve 439 rotatably mounted upon it and abutting sleeve 438 and collar 436. Shaft 414$^b$, which is disposed between the third and fourth banks of converting mechanism, has a sleeve 437 rotatably mounted upon its forward end and abutting shifter 420, a sleeve 440 rotatably mounted upon the shaft and abutting sleeve 437, a sleeve 438 secured to the shaft and abutting sleeve 440, and a sleeve 441 rotatably mounted on the shaft between sleeve 438 and collar 436. Shaft 414$^c$, which is disposed between the fifth and sixth banks of converting mechanism, has a sleeve 442 rotatably mounted upon it and abutting shifter 420 and a sleeve 438 which is secured to the shaft and abuts collar 436.

Shaft 415$^a$, which is disposed between the second and third banks of converting mechanisms, has a sleeve 443 on its forward end abutting shifter 420, a sleeve 444 abutting sleeve 443, and a sleeve 445 abutting sleeve 444 and collar 436. Shaft 415$^b$, which is disposed between the fourth and fifth banks of converting mechanism, has a sleeve 446 upon its forward end and abutting shifter 420, a sleeve 444 abutting sleeve 446, and a sleeve 447 abutting sleeve 444 and collar 436.

Shaft 416$^a$, which is disposed in alignment with the second bank of converting mechanism, has a sleeve 37 upon its forward end abutting shifter 420, a sleeve 448 abutting sleeve 437, a sleeve 449 abutting sleeve 448, a sleeve 450 abutting sleeve 449, and a sleeve 451 abutting sleeve 450 and collar 436. Shaft 416$^b$, which is in alignment with the fourth bank of converting mechanism, has a sleeve 452 abutting shifter 420, a sleeve 450 abutting sleeve 452, a sleeve 449 abutting sleeve 450, a sleeve 453 abutting sleeve 449, and a sleeve 454 abutting sleeve 453 and collar 436.

Shaft 418$^a$, which is in alignment with the third bank of converting mechanism, has a sleeve 455 mounted upon its forward end and abutting shifter 431, a sleeve 456 abutting sleeve 455, a sleeve 457 abutting sleeve 456, a sleeve 458 abutting sleeve 457, a sleeve 459 abutting sleeve 458, and a sleeve 460 abutting sleeve 459 and collar 436. Shaft 418$^b$, which is in alignment with the fifth bank of converting mechanism, has a sleeve 461 mounted upon it and abutting shifter 431, a sleeve 457 abutting sleeve 461, a sleeve 458 abutting sleeve 457, and a sleeve 462 abutting sleeve 458 and collar 436. All the sleeves above enumerated are rotatable upon their respective shafts with the exception of sleeves 438.

Each of sleeves 438 has a key 463 fixed in one end, a key 464 in its other end and a key 465 intermediate its ends. Sleeve 440 has a key 466 secured in its forward end and a key 467 in its rear end; sleeve 441 has a key 468 secured in its forward end and a key 469 in a rear end; each sleeve 444 has a key 470 in its forward end; sleeve 445 has a key 471 in its forward end; sleeve 447 has a key 472 in its forward end; sleeve 448 has a key 473 in its forward end and a key 474 in its rear end; each sleeve 449 has a key 475 in its forward end and a key 476 in its rear end; sleeve 450 has a key 477 in its forward end and a key 478 in its rear end; sleeve 453 has a key 479 in its forward end and a key 480 in its rear end; sleeve 454 has a key 481 on its forward end and a key 482 on its rear end; sleeve 456 has a key 483 in its forward end and a key 484 in its rear end; sleeve 457 has a key 485 in its forward end and a key 486 in its rear end; sleeve 458 has a key 487 in its forward end and a key 488 in its rear end; sleeve 459 has a key 489 in its forward end and a key 490 in its rear end; and sleeve 462 has a key 491 in its forward end and a key 492 in its rear end.

When the distributing mechanism is in starting position, as shown in Figure 26, shaft 414ª has a gear 493 slidable on key 463 and meshing with gears 231ª and 256ᵉ, a bevel gear 494 rotatable on sleeve 438 and adapted to be engaged by key 465, a gear 495 slidable on key 464 and meshing with gears 223ᵈ and 245ᶜ, and a bevel gear 496 fixed for rotation with gear 495; gears 494 and 496 meshing with gear 411. Shaft 414ᵇ has a gear 497 slidably engaged by key 466 and meshing with gears 286ª and 316ᵉ, a gear 498 slidable on key 467 and meshing with gears 275ᵈ and 311ᶜ, a gear 499 slidable on key 463 and meshing with gears 274ˢ and 310ᵉ, a gear 500 slidable on key 464 and meshing with gears 263ᵈ and 299ᶜ, a gear 501 slidable on key 468 and meshing with gears 262ª and 298ᵉ, a gear 502 slidable on key 469 and meshing with gears 257ᵈ and 287ᶜ, a gear 494 rotatable on sleeve 438 and adapted to be engaged by key 465, and a gear 496 fixed for rotation with gear 500, gears 494 and 496 meshing with a gear 411. Shaft 414ᶜ has a gear 503 slidably engaged by key 463 and meshing with gears 328ª and 340ᵉ, a gear 504 slidable on key 464 and meshing with gears 317ᵈ and 335ᶜ, a gear 494 rotatable on sleeve 438 and adapted to be engaged by key 465, and a gear 496 fixed for rotation with gear 504; gears 494 and 496 meshing with a gear 411.

Shaft 415ª has a gear 505 slidably engaged by key 470 and meshing with gears 251ª and 281ᵇ, a gear 506 slidably engaged by key 470 and meshing with gears 250ᵈ and 280ᶜ, a gear 507 slidably engaged by key 471 and meshing with gears 242ª and 269ᵇ, and a gear 508 slidably engaged by key 471 and meshing with gears 241ᵈ and gear 268ᶜ. Shaft 415ᵇ has a gear 509 slidably engaged by key 470 and meshing with gears 305ª and 332ᵇ, a gear 510 slidably engaged by key 470 and meshing with gears 304ᵈ and 331ᶜ, a gear 511 slidably engaged by key 472 and meshing with gears 293ª and 323ᵇ, and a gear 512 slidably engaged by key 472 and meshing with gears 292ᵈ and 322ᶜ.

Shaft 416ª has a gear 513 rotatable on sleeve 448 adjacent key 473 and meshing with gear 493; a gear 514 slidable on key 474 and meshing with gear 505, a gear 515 slidable on key 475 and meshing with gear 506, a gear 516 slidable on key 477 and meshing with gear 495, and a gear 517 slidable on key 478 and meshing with gear 507. Shaft 416ᵇ has a gear 518 meshing with gear 498 and slidably engaged by key 477, a gear 519 meshing with gear 499 and adapted to be engaged by key 477, a gear 520 meshing with gear 509 and slidable on key 478, a gear 521 meshing with gear 510 and slidable on key 475, a gear 522 meshing with gear 500 and slidable upon key 479, a gear 523 rotatable on sleeve 453 in mesh with gear 501 and adapted to be engaged by key 479, a gear 524 meshing with gear 511 and slidable on key 480; a gear 525 meshing with gear 512 and slidable on key 481; and a gear 526 rotatable on collar 436 in mesh with gear 502 and adapted to be engaged by key 482.

Shaft 418ª has a gear 527 rotatable on sleeve 455 in mesh with gear 497 and adapted to be engaged by key 483, a gear 528 meshing with gear 505 and slidable on key 484, a gear 529 meshing with gear 506 and slidable on key 485, a gear 530 rotatable on sleeve 457 in mesh with gear 498 and adapted to be engaged by key 486; a gear 531 meshing with gear 499 and slidable on key 486, a gear 532 meshing with gear 507 and slidable on key 488, a gear 533 meshing with gear 508 and slidable on key 489, a gear 534 rotatable on sleeve 459 in mesh with gear 500 and adapted to be engaged by key 490, and a gear 535 meshing with gear 501 and slidable on key 490. Shaft 418ᵇ has a gear 536 meshing with gear 510 and slidable upon key 485, a gear 537 meshing with gear 503 and slidable on key 486, a gear 538 meshing with gear 511 and slidable on key 488, a gear 539 meshing with gear 512 and slidable on key 491, and a gear 540 rotatable on sleeve 462 in mesh with gear 504 and adapted to be engaged by key 492.

When cam 718 is rotated to push pin 422 rearwardly relatively to frame 402, shifter 420 will move shafts 414, 415 and 416 rearwardly and shifter 431 will move shafts 418 forwardly while the cross-bars in the frame will hold the gears against axial movement and hold them in mesh with their respective gears. This will move the sleeves and keys relatively to the gears and arrange them as shown in Figure 27.

The mechanism, for stopping the converting gears in their zero positions when the converting mechanism is reset, properly forms a part of the converting mechanism and its parts have been designated by the same group of reference numerals. This mechanism consists principally of seven clearing bars supported on shafts 414 and 415 and means for bringing hook arms carried by these bars into engagement with pins carried by the converting gears.

The clearing bars, which are connected to each other near their ends by bars 361 and 362, extend over the top of frame 402. The rearmost clearing bar is disposed adjacent bar 406 (see Figure 5), and consists of a short bar 363, secured to the end of bar 361, and a bar 364 secured to the end of bar 362. The third clearing bar is disposed adjacent bar 407 and consists of a short bar 365 secured to bar 362 and a short bar 366 secured to bar 361. The fifth clearing bar 367 is disposed adjacent bar 413 and secured to bar 361; the seventh or forwardmost clearing bar 368 is secured to the ends of bars 361 and 362 adjacent the forwardmost bar 405. The reference characters 369, 370 and 371 designate the second, fourth and sixth clearing bars which are disposed intermediate the first and third, the third and fifth and the fifth and seventh clearing bars respectively.

Each clearing bar is provided with slots 372 (see Figure 10), through which shafts of the converting mechanism extend, and with hook arms 373. Each clearing bar is adjacent two or more converting gears so that, when the bars are moved transversely of frame 402, each hook arm may engage a pin 374 which is secured to a tooth of each gear at its zero position relatively to the arm 373 which coacts with it. By referring to Figures 4 and 6 it will be noted that a number of gears in the converting mechanism are arranged in close proximity to one another. In this case, the pins 374 in adjacent gears extend toward one another so that the same hook arm may engage both pins and stop the two gears in their zero position.

A rock shaft 375 is mounted in struts 54 and 55 and provided with arms 376 and 377 which engage bar 361, as shown in Figures 3, 4 and 10. A spring 378 encircles shaft 375 and has one of its ends secured to the shaft and its other end to strut 54 for holding arms 376 and 377 in the position shown in the drawings. The other end of shaft 375 overlaps the side of cam 714 and has a tapered arm 379 extending downwardly and adapted to be abutted by a lug 759 on cam 714. When this cam is rotated, lug 759 will engage the sloping face 380 on arm 379 and swing the arm outwardly, causing arms 376 and 377 to move bar 361 transversely of the machine and cause the hook arms 373 on the clearing bars to move into position for engaging pins 374. At this time, the converting gears are being rotated, as will presently be described, and pins 374 will abut the hook arms when the gears arrive at their zero positions and hold the gears against further rotation.

The registering mechanism is divided into six banks and each bank consists of a dial rotatably supported by a strut 63 extending transversely of the casing, a gear fixed for rotation with the dial and meshing with a gear fixed on the main shaft of the corresponding bank of converting mechanism, and transfer mechanism supported by that shaft. The dials indicated by the reference numerals 601, 602, 603, 604, 605 and 606, have gears 607, 608, 609, 610, 611 and 612 fixed for rotation with them and meshing with gears 613, 614, 615, 616, 617 and 618 which are fixed on shafts 201, 202, 203, 204, 205 and 206, respectively.

In each bank of mechanism, a stopping disk is mounted on a sleeve on the main shaft, a spiral spring has one end fixed to the sleeve and the other end to a transfer rod which is mounted on the shaft and abuts pins fixed in the stopping disk of the adjacent bank of mechanism, and a cam disk is fixed to the main shaft for moving the transfer rod except in the sixth or last bank of mechanism in which the cam disk and transfer rod are omitted and one end of the spring secured to a lug. The arrangement of disks, pins, spring and transfer rod is best shown in Figure 7 in which the cam disk in the fifth bank is partly broken away.

In the first bank of mechanism, a stopping disk 619 is slidably keyed on sleeve 230 near its front end and provided on its uppermost edge with a notch 620 which, when the machine is in operation, is engaged by the lower end of a stop 621 secured to the front wall of the casing, (see Figure 1). A spiral spring 622 has one end secured to the end of sleeve 230 and its other end to a transfer rod 623 which has a slot spaced from one end, through which shaft 201 extends, and a slot spaced from its other end which straddles a pin 625 fixed in a bar 626 which has its ends secured to the side walls of the casing.

A cam disk 627, secured for rotation with shaft 201, has a cam face 628, which extends 9/20 of the circumference of the disk, and a cam face 629, which is struck with a greater radius than cam face 628 and also extends 9/20 of the circumference of the cam disk; each end of one cam face merging into the adjacent end of the other cam face through a distance equal to 1/20 of the circumference of the disk. A pin 630, fixed in the end of transfer rod 623, normally abuts the upper part of cam face 629, a pin 631, fixed in the transfer rod intermediate its ends, abuts the lower part of cam face 628, and a lug 632, fixed on the other end of the transfer rod, abuts pins carried by the adjacent stopping disk.

Figure 7:
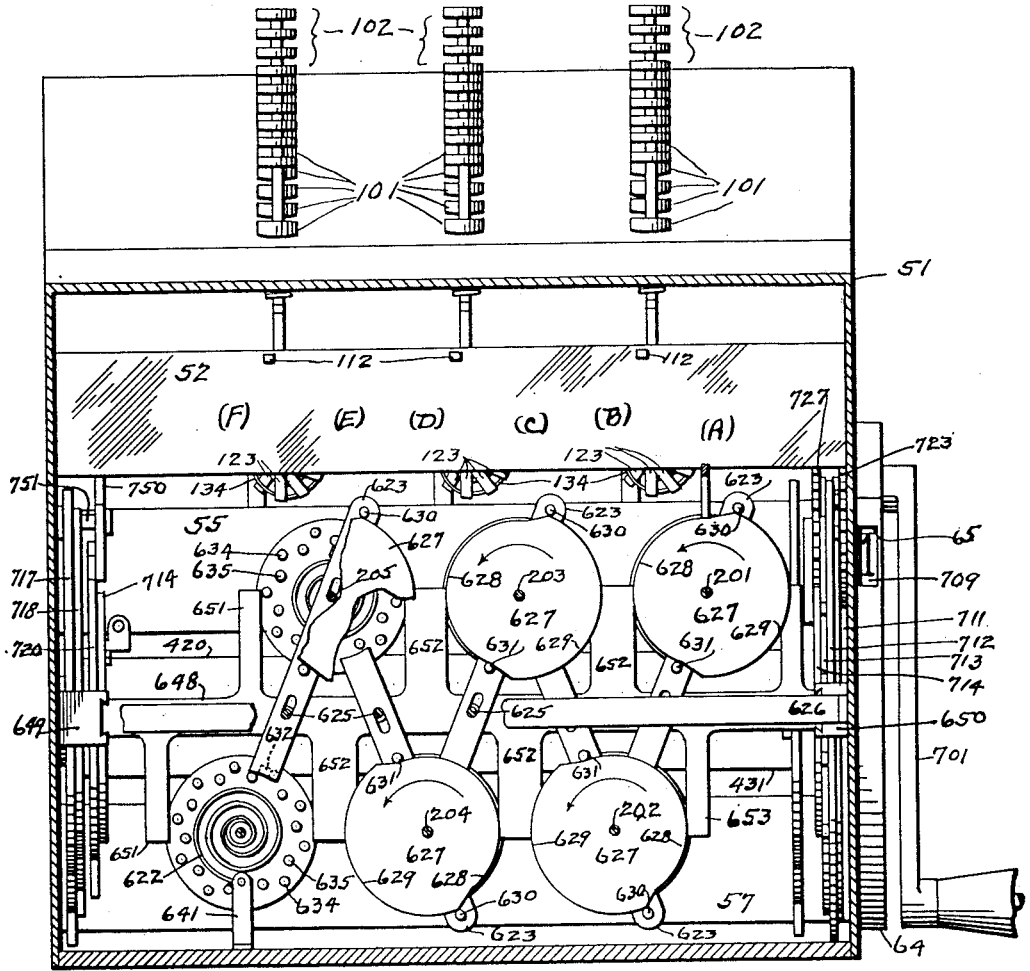
Figure 7 is a transverse section, taken on line 7—7 on Figure 1, showing the carrying-over mechanism, certain parts of which are broken away.
Figure 8:
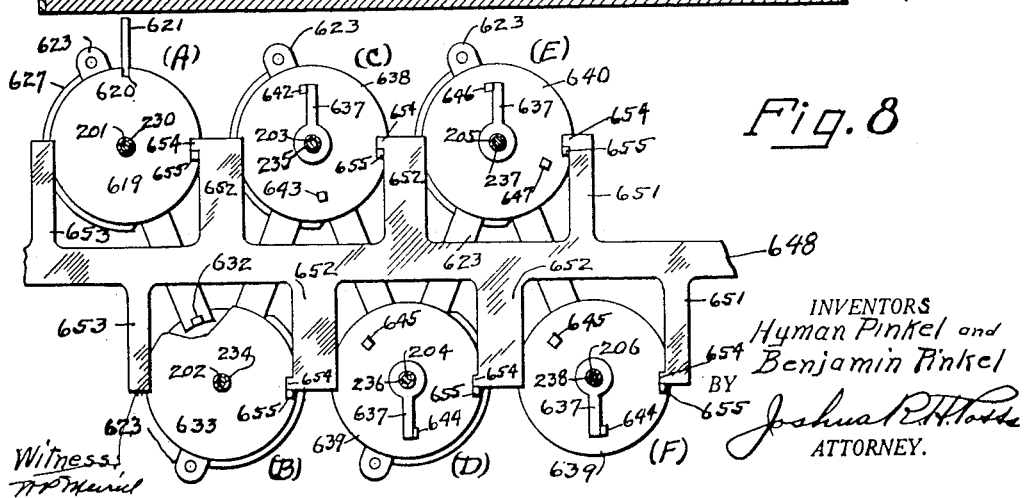
Figure 8 is a detail view showing the stopping disks and the means for holding them against rotation; the view being taken in the plane of line 8—8 on Figure 1.

When the cam disk is rotated one half-revolution in the direction of the arrows shown in Figure 7, pin 630 will pass from cam face 629 onto cam face 628 and pin 631 from cam face 638 onto cam face 629 and move the transfer rod longitudinally. When the cam disk is rotated a second half-revolution, the pins will again pass from one cam face to the other and move the transfer rod back to its original position.

In the second bank of mechanism, a stopping disk 633 is slidably keyed on sleeve 234 and has ten pins 634 equally spaced in a circle adjacent its periphery, one of which is abutted by lug 632 on the transfer rod in the first bank of mechanism when the cam disk is in the position shown.

A second circle of pins 635 are secured to disk 633 concentric with the circle of pins 634 and spaced intermediate the pins in that circle but on a shorter radius. When cam disk 627 in the first bank has been rotated so that pin 630 rides onto cam face 628 and pin 631 rides on cam face 629, the transfer rod will be shifted sufficiently to bring its lug 632 in the path of a pin 635. A cam disk 627 is fixed on shaft 202 and abutted by pins 630 and 631 in a transfer rod 623 mounted and functioning in the same manner as just described and having its end extending into and coacting with the transfer mechanism supported by shaft 203. A spiral spring 622 has one end secured to sleeve 634 and its other end bent around the edge of the transfer rod.

The third, fourth and fifth banks of transfer mechanisms are exactly alike and differ from the second bank of transfer mechanism only in that the stopping disks are slidably keyed on short sleeves rotatably mounted on shafts 203, 204 and 205, the spiral springs secured to these sleeves, the stopping disks provided with lugs which abut arms 637 fixed on sleeves 235, 236 and 237. The stopping disks differ from disk 633 only in the addition of the lugs and have been indicated by numerals 638, 639, 640, respectively.

The sixth bank of transfer mechanism differs from the fourth bank of transfer mechanism only in the omission of the cam disk and the transfer rod and by securing the end of spiral spring 622 to a lug 641 secured to the casing, the several parts being indicated by the same reference numerals.

The arbitrary amounts of 9, 7, 6 and 7, which were added to columns C, D, E and F, respectively, in Table III in order to compensate for the base figures used in obtaining the complements of the quarter-squares of the minus quantities, are taken care of in the machine by fixing an arm 637 on sleeves 235, 236, 237 and 238, rotatably mounting the stopping disks in the third, fourth, fifth and sixth banks of mechanisms, and providing these disks with lugs which will permit each arm 637 and the sleeve to which it is attached to rotate an amount equal to the arbitrary amount placed in the corresponding column of Table III.

When the machine is in its starting position, the arm 637, which is keyed to sleeve 235, abuts a lug 642 fixed on the back of disk 638 and a second lug 643 is secured to this disk in such a position that arm 637 will make 9/20 of a revolution, corresponding to the 9 placed in column C, before engaging it and fixing disk 638 for rotation with sleeve 235.

The arm 637 on sleeve 236 abuts a lug 644 on disk 639 when the machine is in its starting position and will make 7/20 of a revolution, corresponding to the 7 placed in column D, before abutting a lug 645 on disk 639 and fixing the disk for rotation with sleeve 236.

The arm 637 on sleeve 237 abuts a lug 646 on disk 640 when the machine is in its starting position and will make 6/20 of a revolution, corresponding to the 6 placed in column E, before abutting a lug 647 on disk 640 and, fixing the disk for rotation with sleeve 237. As a 7 was added into both columns D and F, the sixth bank has a stopping disk 639, identical with the disk 639 in the fourth bank of mechanism, and the arm 637 fixed on sleeve 238 will make 7/20 of a revolution in moving from engagement with lug 644 into engagement with lug 645.

A shifter 648, which has its ends slidably mounted in guides 649 and 650 fixed to the side walls of the casing, is provided with an upwardly extending arm 651, having a groove in which the periphery of stopping disk 640 is rotatable, and a downwardly extending arm 651 having a groove in which the periphery of disk 639 is rotatable. Two upwardly extending arms 652 and two downwardly extending arms 652 extend between adjacent shafts and have grooves in each edge in which the peripheries of the stopping disks are rotatable. An arm 653 extends upwardly and is provided with a groove in which the periphery of disk 619 is rotatable and a similar arm 653 extends downwardly and is provided with a groove in which disk 633 is rotatable. Each of arms 651 and 652 are provided with an extension 654 normally abutted on its underside by a lug 655 formed on each of the stopping disks.

An arm 656 is secured to or formed on each end of shifter 648 and has a pin 657 secured in its free end and engaging a cam groove 715 formed in the cam 714 of the driving mechanism. When the machine is in starting position, as shown in the drawings, stop 621 is out of engagement with notch 620 in disk 619 and the lugs 632 on the transfer rods out of engagement with the pins 633 and 635 on the other stopping disks. As soon as cam 714 starts to rotate, cam groove 715 will thrust shifter 648 forwardly and bring stop 621 into engagement with notch 620 and lugs 632 in alignment with pins 633.

While the machine may be arranged to be operated either by hand, by power, or by both, it is shown provided with an operating crank 701 which is fixed for rotation with a shaft 702 journaled in a bearing 703 mounted in a recess 64 formed in the side wall of the casing. A gear 704, fixed on the inner end of shaft 702, meshes with a gear 705 fixed on a shaft 706 which is mounted in a bearing 707, fixed in recess 64, and in a bearing 708 fixed to the side wall of the casing.

A drum 709 is secured to gear 705 and provided with numerals 1 to 4 spaced 90° apart upon its periphery and visible through an opening 65 formed in recess 64. When numeral 1 is visible through opening 65, the several mechanisms are in the positions shown in the drawings. When handle 701 has made one complete revolution, gear 705 will have made a quarter-revolution and the numeral 2 will be visible through opening 65; the numerals 3 and 4 being visible through the opening when gear 705 has made its second and third quarter-revolutions, respectively.

Adjacent gear 705, a disk 711, a disk 712 and a disk 713 are rigidly secured on shaft 706. A cam 714 is secured to disk 713 and shaft 706 and provided with a cam slot 715 in which the pin 657 in the right hand arm 656 is slidable. Spacers 716 are mounted on shaft 706 to provide clearance for the arm 656 and are abutted by a cam 717 which is fixed for rotation with the shaft and engaged at its periphery by pin 425.

Abutting bearing 708, a second cam 717 which is fixed for rotation with shaft 706 and engaged at its periphery by pin 433. A cam 718 is fixed on shaft 706, abuts cam 717 and is engaged at its periphery by pin 422. A spacer 719 separates cam 718 from a cam 720 which is fixed on shaft 706 and has a second cam 714 secured to it and provided with a cam groove 715 in which the pin 657 on the left hand arm 656 is slidable.

A shaft 721 has one end mounted in the side wall of the casing and its other end mounted in a support 722 which has its lower end secured to the casing, as shown in Figure 9. A gear 723 is rotatably mounted on shaft 721 and has a Geneva gear 724 fixed for rotation with it and spaced by a ring 726 from a rotatably mounted Geneva gear 725 which has a spur gear 727 fixed for rotation with it and abutting support 722.

As shown in Figure 13, a part 728 of the periphery of disk 713 engages one of the arcuate faces 729 of Geneva gear 725 for holding it against rotation. A part 730 of the periphery of disk 713 has a shorter radius than part 728 in order to clear the corners of gear 725 when it is being rotated by gear 727. Four pins 731 extend from disk 712 adjacent its periphery and the periphery of disk 713 has three arcuate recesses 732 in radial alignment with three of these pins for clearing the corners of gear 725 when the disks are rotated to bring pins 731 successively into engagement with the slots 733 formed in the corners of gear 725; the fourth pin being opposite face 730. As shown in Figure 1, disk 711 is opposite hand to disk 713 and four pins 734 extend from disk 712 in alignment with its recesses 732 and are adapted to engage the slots 733 in Geneva gear 724; pins 731 and 734 being in adjacent quadrants of disk 712.

An idler gear 735, rotatably mounted upon a stub shaft 736 supported by the side wall of the casing, meshes with gear 723 and with a gear 737 keyed to a shaft 738 which has its ends rotatably mounted in the side wall of the casing and in support 722. A gear 739, meshing with gear 727, is also keyed on shaft 738 and a sprocket gear 740 is disposed between gears 737 and 739 and fixed for rotation with them. An endless chain 741 engages sprocket gear 740 and sprocket gear 213 of the converting mechanism.

When the mechanisms are in the positions shown in the drawings, pin 422 rests against a cam face 742 on cam 718 and pin 433 rests against a cam face 743 on cam 717, (see Figures 3 and 5). During the first quarter revolution of the cams, pins 422 and 433 ride up onto the cam faces 744 and 745, respectively, which have greater radii than faces 742 and 743; the paths of the two pins being parallel to one another. When the first quarter-revolution is completed, pin 433 rides onto cam face 746, which has the same radius as face 743, and pin 422 rides onto a cam face 747 which has a radius slightly greater than face 742; both cams 717 being fixed in the same relative position on shaft 706, pins 425 and 433 are simultaneously moved the same amount and in the same direction. Frame 401 and shifter 420 are thus moved rearwardly the same distance but, at the completion of the first quarter-revolution, frame 401 is returned to its normal position while shifter 420 is held intermediate its extreme positions.

During the second quarter-revolution, pins 422 and 433 ride onto cam faces 748 and 749 which are parallel to one another and on the same radii as faces 744 and 745, respectively, thus forcing frame 401 and shifter 420 to their rearmost positions. During the third quarter-revolution and the greater part of the fourth revolution, frame 401 and shifter 420 are thus held in their rearmost position but, by the end of the fourth quarter-revolution, the pins have moved onto faces 742 and 743, as shown in the drawings.

A segmental gear 750, which meshes with gear 133, is rockably mounted on a stub shaft 751 supported by the casing and is yieldingly held in the position shown by a coil spring 752. An arm 753 is formed on gear 750 and provided on its free end with a roller 754 which rides upon the periphery of cam 720. During the first part of the first quarter-revolution of cam 720, roller 754 will ride up onto a cam face 755 and rock segmental gear 750 which will rotate gear 129. While roller 754 is riding upon face 755, gear 133 is held against rotation and, during the last part of the first quarter-revolution, roller 754 will ride downwardly onto a cam face 756 and permit spring 752 to retract gear 750 and return gear 133 to its starting position. During the second quarter-revolution, roller 754 will ride up onto a cam face 757, causing gear 750 to be rocked and gear 129 to be rotated, ride along face 757 and then ride downwardly onto a cam face 758 and permit gear 133 to be returned to its starting position in which it remains during the last half-revolution of the cam.

In order that an understanding of the operation of the machine may be had, a practical example will now be given:

Assuming that the numbers 456, representing *abc*, and 312, representing *fgh*, are to be multiplied, the 6 key in the first bank, the 5 key in the second bank and the 4 key in the third bank are depressed in the usual manner. This will cause key-bars 112 to be thrust forwardly against the action of springs 119 and a pin 113 in each keybar to engage the stop 115 on the depressed key and hold that key against upward movement while the stops also prevent the keybars from returning to their fully retracted positions and hold arms 124 out of engagement with arms 122.

Crank 701 is then given a complete revolution causing the gear, disks and cams on shaft 706 to make a quarter revolution in the direction of the arrows on Figures 1 and 3. At the beginning of this quarter-revolution, cam grooves 715 thrust pin 657 forwardly and causes stop 621 to engage notch 620 in stopping disk 619 and the transfer rods to engage the pins in the other stopping disks. At the same time, roller 754 starts to move from cam face 758 to cam face 755 and, during this movement, rocks segmental gear 750 and rotates gear 133, thus imparting rotation to sprocket gears 126 through bevel gears 131 and 129, sprocket gear 128 and chain 127 and rotating shafts 120 until an arm 123 on each comes in contact with a depressed key and stops rotation of the shaft, springs 134 permitting the sprocket wheels to complete their revolution.

When the arm 123 on the shaft 120 under the first bank of keys engages the 6 key, the shaft will have made 6/10 of a revolution and cause gear 143 to move rack 144 downwardly and rotate gear 401 on shaft 414$^a$ 6/10 of a revolution. As sleeve 438 is fixed to the shaft, gear 493 engaged by key 463, and gear 495 engaged by key 464, these gears will be rotated to an amount equal to 6.

When the arm 123 in the second bank engages the 5 key, the shaft 120 in that bank will have made 5/10 of a revolution and cause its gear 143 to move the rack 144 downwardly and rotate gear 401 and shaft 414$^b$ 5/10 of a revolution. As sleeve 438 is fixed to the shaft, gear 499 in engagement with key 463, and gear 500 in engagement with key 464, these gears will be rotated an amount equal to 5.

When the arm 123 in the third bank has come in contact with the 4 key, the shaft 120 in that bank will have made 4/10 of a revolution and rotated shaft 414$^c$ an equal amount through gear 143, rack 144 and gear 401. As sleeve 438 is secured to the shaft, gear 503 in engagement with key 463 and gear 504 in engagement with key 464, these gears will be rotated an amount equal to 4.

When gears 493 and 495 are rotated 6/10 of a revolution, they will rotate gears 231$^a$ and 256$^e$ and 223$^d$ and 245$^c$ an amount equal to six as they are in mesh with them. Gear 516 meshes with gear 495 and is fixed for rotation with gear 517 which meshes with gear 507 which is also in mesh with gears 242$^a$ and 269$^b$ and rotates them an amount equal to 6. Gear 508 is fixed for rotation with gear 507 and meshes with gears 241$^d$ and 268$^c$ and rotates them an amount equal to 6. Gear 533 meshes with gear 508 and is fixed for rotation with gear 535, which meshes with gear 501. This gear meshes with gears 262$^a$ and 298$^e$ and rotates them an amount equal to 6. Gear 502 is fixed for rotation with gear 501 and meshes with gears 257$^d$ and 287$^c$ and rotates them an amount equal to 6.

When gears 499 and 500 are rotated 5/10 of a revolution, they will rotate gears 274$^a$, 310$^e$, 263$^d$ and 299$^c$ an amount equal to 5 as they are in mesh with them. Gear 531 meshes with gear 499 and has gear 529 fixed for rotation with it meshing with gear 506 which has gear 505 fixed for rotation with it. Gear 506 meshes with gears 250$^d$ and 280$^c$ and rotates them an amount equal to 5 and gear 505 meshes with gears 251$^a$ and 281$^b$ and rotates them an amount equal to 5. Gear 522 meshes with gear 500 and has gear 524 fixed for rotation with it and meshing with gear 511 which has gear 512 fixed for rotation with it. Gear 511 meshes with gears 293$^a$, 323$^b$ and rotates them an amount equal to 5 and gear 512 meshes with gears 292$^d$ and 322$^c$ and rotates them an amount equal to 5.

When gears 503 and 504 are rotated 4/10 of a revolution, gears 328$^a$, 340$^e$, 317$^d$ and 335$^c$, with which they are in mesh, will be rotated an amount equal to 4. Gear 503 meshes with gear 537 which has gear 536 fixed for rotation with it and meshing with gear 510 which has gear 509 fixed for rotation with it. Gear 510 meshes with gears 304$^d$ and 331$^c$ and rotates them an amount equal to 4 and gear 509 meshes with gears 305$^a$ and 332$^b$ and rotates them an amount equal to 4. Gear 520 meshes with gear 509 and has gear 518 fixed for rotation with it and meshes with gear 498 which has gear 497 fixed for rotation with it. Gear 498 meshes with gears 275$^d$ and 311$^c$ and rotates them an amount equal to 4 and gear 497 meshes with gears 286$^a$ and 316$^e$ and rotates them an amount equal to 4.

The distributing of the Figures 4, 5 and 6 upon the converting mechanism takes place while roller 754 is rising from cam face 758 to cam face 755. During this period, the pins 425 and 433 are riding on the faces 743 of cams 717 and pin 422 is riding on cam face 742, so that frame 402 and shifters 420 and 431 remain stationary. As cam 720 continues its quarter revolution, roller 754 will ride along cam face 755 and hold gear 750 against movement. At this time, pin 422 rides up onto cam face 744 and pins 425 and 433 ride up onto cam faces 745, causing frame 402 and shifters 420 and 431 to move rearwardly and move the gears of the distributing mechanism out of engagement with the gears of the converting mechanism. They are held in this position while the pins ride along on cam faces 744 and 745, during which time, roller 754 rides downwardly from cam face 755 to cam face 756 and allows spring 752 to retract gear 750 and return shafts 120 to their starting positions, causing racks 144 to be elevated and the distributing gears rotated to their starting positions.

As frame 402 moves rearwardly, it engages the lower end of lever 140 and causes the upper end of this lever to move the lower end of lever 139 rearwardly and rock shaft 135, causing arms 138 to thrust keybars 124 forwardly and release the depressed keys. As cams 717 and 718 complete their first quarter-revolution, pins 425 and 433 ride from cam faces 745 down onto cam face 746 and pin 422 rides from cam face 744 down onto cam face 747, allowing springs 434 to return frame 402 to its original position as cam faces 743 and 746 have the same radius. As the frame returns to its normal position, springs 119 retract keybars 112 so that the tabulating mechanism is now in its starting position.

The radius of cam face 747 is greater than the radius of cam face 742 so that pin 422 and, consequently, shifter 420 do not return as far forwardly as does frame 402. As shaft 426 has its ends journaled in the side bars of frame 402, the frame moving forwardly farther than shifter 420 will cause arms 427 to rock and cause shifter 431 to move forwardly relatively to frame 402.

Thus at the completion of the first quarter-revolution of the cams, frame 402 is in its starting position, shifter 420 slightly rearward of its starting position and shifter 431 slightly forward of its starting position. As the gears in the distributing mechanism are held against axial movement by the cross-bars of the frame, the sleeves and the shafts have moved from the positions shown in Figure 26 to the positions shown in Figure 27. When the multiplicand 456 was set upon the machine, gears 493, 495, 499, 500, 503 and 504 were rotated in the same direction but, when the sleeves are shifted into the position shown in Figure 27, bevel gears 494 are in engagement with keys 465 and gears 495, 500 and 504 are rotated oppositely to gears 493, 499 and 503.

Keys representing the multiplier 312 are now depressed and crank 701 given a second complete revolution to rotate shaft 706 a quarter-revolution. As cam 720 rotates, roller 754 will ride up from cam face 756 to cam face 757 and rock gear 750, causing rotation of shafts 120, and consequently cause shafts 414$^a$, 414$^b$ and 414$^c$ to rotate amounts equal to 2, 1 and 3, respectively, in the same manner as previously described.

As shaft 414$^a$ rotates, gear 493 will rotate gears 231$^a$ and 256$^c$ an amount equal to 2 and in the same direction as previously so that these gears have now been rotated a total distance equal to 8. Gear 495 will rotate gears 223$^d$ and 245$^e$ an amount equal to 2, but in the opposite direction, thus subtracting the amount of 2 so that these gears have now been rotated a total amount equal to 4.

Gear 513 meshes with gear 493 and has gear 514 fixed for rotation with it and meshing with gear 505 which meshes with gears 251$^a$ and 281$^b$ and rotates them an amount equal to 2 in the same direction as formerly so that these gears have now been rotated an amount equal to 7. Gear 528 meshes with gear 505 and has gear 527 fixed for rotation with it and meshing with gear 497 which meshes with gears 286$^a$ and 316$^e$ and rotates them an amount equal to 2 in the same direction as formerly so that these gears have been rotated an amount equal to 6. Gear 516 meshes with gear 495 and has gear 515 fixed for rotation with it and meshing with gear 506 which meshes with gears 250$^d$ and 328$^c$ and rotates them an amount equal to 2 but oppositely to their former direction so that these gears have now been rotated a total amount equal to 3. Gear 529 meshes with gear 506 and has a gear 530 fixed for rotation with it and meshing with gear 498 which meshes with gears 275$^d$ and 311$^c$ and rotates them an amount equal to 2 but oppositely to their former direction so that these gears have now been rotated an amount equal to 2.

As shaft 414$^b$ rotates an amount equal to 1, gear 499 will rotate gears 274$^a$ and 310$^e$ an amount equal to 1 in the same direction as formerly, so that these gears have now been rotated a total amount equal to 6, and gear 500 will rotate gears 263$^d$ and 299$^c$ an amount equal to 1 but oppositely to their former direction so that these gears have now been rotated a total amount equal to 4.

Gear 531 meshes with gear 499 and has gear 532 fixed for rotation with it and meshing with gear 507 which meshes with gears 242$^a$ and 269$^b$ and rotates them an amount equal to 1 in the same direction as formerly so that these gears have now been rotated a total amount equal to 7. Gear 519 meshes with gear 499 and has gear 520 fixed for rotation with it and meshing with gear 509 which meshes with gears 305$^a$ and 332$^b$ and rotates them an amount equal to one in the same direction as formerly so that these gears have now been rotated a total amount equal to 5.

Gear 534 meshes with gear 500 and has gear 533 fixed for rotation with it and meshing with gear 508 which meshes with gears 241$^d$ and 268$^c$ and rotates them an amount equal to one but oppositely to their former direction so that these gears have now been rotated a total amount equal to 5. Gear 522 meshes with gear 500 and has gear 521 fixed for rotation with it and meshing with gear 510 which meshes with gears 304$^d$ and 331$^e$ and rotates them an amount equal to 1 but oppositely to their former direction so that they have now been rotated a total amount equal to 3.

As shaft 414$^c$ rotates an amount equal to 3, gear 503 will rotate gears 328$^a$ and 340$^e$ an amount equal to 3 in the same direction as formerly so that these gears have been rotated a total amount equal to 7 and gear 504 will rotate gears 317$^d$ and 335$^e$ an amount equal to 3 but oppositely to their former direction so that these gears have now been given a total rotation equal to 1.

Gear 537 meshes with gear 503 and has gear 538 fixed for rotation with it and meshing with gear 511 which meshes with gears 293$^a$ and 323$^b$ and rotates them an amount equal to 3 in the same direction as formerly so that these gears have now been rotated a total amount equal to 8. Gear 524 meshes with gear 511 and has gear 523 fixed for rotation with it and meshing with gear 501 which meshes with gears 262$^a$ and 298$^e$ and rotates them an amount equal to 3 so that these gears have now been rotated a total amount equal to 9.

Gear 540 meshes with gear 504 and has gear 539 fixed for rotation with it and meshing with gear 512 which meshes with gears 292$^d$ and 322$^e$ and rotates them an amount equal to 3 but oppositely to their former direction so that these gears have now been rotated a total amount equal to 2. Gear 525 meshes with gear 512 and has gear 526 fixed for rotation with it and meshing with gear 502 which meshes with gears 257$^d$ and 287$^e$ and rotates them an amount equal to 3 but oppositely to their former direction so that these gears have now been rotated a total amount equal to 3.

The above described movements of the distributing and converting mechanism take place while roller 754 is moving from cam face 756 to cam face 757, at which time, pins 422, 425 and 433 are moving along cam faces 747 and 746 respectively, which are parallel to one another, thus holding the shafts and sleeves in the positions shown in Figure 27. As roller 754 rides along cam face 757, the gears of the tabulating and distributing mechanisms are held stationary and pins 422, 425 and 433 ride from cam faces 747 to 748 and 746 to 749 respectively, thus forcing frame 402 and shifters 420 and 431 rearwardly so that none of the gears of the distributing mechanism are in mesh with any gear of the converting mechanism. As frame 402 moves rearwardly, it engages lever 140 and resets the keys, as previously described. Cam faces 746 and 747 are parallel, cam faces 748 and 749 are parallel and cam faces 760 and 761, which connect cam faces 746 to 749 and 747 and 748, respectively, are parallel so that the sleeves are not moved relatively to the gears of the distributing mechanism.

After these pins have ridden onto cam faces 748 and 749, roller 754 rides down from cam face 757 to cam face 758 and permits spring 752 to return gear 750 to the position shown in the drawing and cause the tabulating and the distributing gears to be returned to their starting positions, as previously described.

During the first two revolutions of the crank, Geneva gears 724 and 725 have been held against rotation as their faces 729 have been riding upon the parts 728 of the peripheries of disks 711 and 713. The crank is now given another complete revolution and the faces 729 will ride off from parts 728 and the first pin 731 will ride into the slot 733 in Geneva gear 725 and cause it to rotate, its corner being accommodated by the first recess 732. As the first pin leaves slot 733, the second pin enters the following slot 733 and causes it to make a second quarter-revolution while the third and fourth pins enter succeeding slots in the gear and complete the revolution.

As spur gear 727 is fixed for rotation with gear 725 and meshes with gear 739, sprocket gear 740 and gear 737 are rotated as they are fixed for rotation with gear 739. As gear 723 is fixed for rotation with Geneva gear 724 and connected to gear 737 through idler 735, gear 724 will be rotated, its face 729 having ridden off from part 728 as previously described.

Sprocket gear 740 being thus rotated, will cause chain 741 to rotate sprocket gear 213 and impart rotation to gears 214 and 215 through gears 209 and 210. The ratio of the gearing is such that the registering mechanism is rotated sufficiently to register the highest possible number, in the present instance, the ratio being six to one between the Geneva gears and gears 214 and 215. As gears 214 and 215 are connected into a train and connected to their shafts by spiral springs, the gears will be rotated an equal amount and the shafts rotated as far as permitted by the converting mechanism, the springs permitting the gears to rotate independently of the shafts after the shafts are held stationary.

All six banks of converting mechanism operate simultaneously and produce the product of the two numbers during one-quarter of a revolution of the operating cams but it is necessary to consider the operation of the several parts in conjunction with Tables V and VI. The values of the stops, with which the pins in the arms are brought into alignment in each instance, are the same as the values given in the corresponding positions in the tables.

For illustration, 231$^a$ has been rotated an amount equal to the sum of 8 and the pin in arm 229ˢ is aligned with the 6 stop on stop plate 228ᵍ as we find a 6 in the units column opposite the sum of 8 in the first column in Table V. Likewise, gear 223ᵈ has been rotated an amount equal to the difference of 4 and its cam slot has moved the pin in arm 225ˢ in alignment with the 6 stop on stop plate 226ᵐ as we find a 6 in the units column of Table VI opposite the difference of 4 in the first column.

Arm 225ˢ is fastened to shaft 201 which is rotated by its spring 221 until the pin in arm 225ˢ engages stop 6 on stop plate 226ᵐ, or 6/20 of a revolution. Stop plates 226ᵐ and 228ᵍ are fixed together and may rotate until the 6 stop on stop plate 228ᵍ abuts the pin in arm 229ˢ, or an additional 6/20 of a revolution. As arm 229ˢ is fixed to sleeve 230, which is fixed to disk 619 and this disk held against rotation by stop 621, further rotation of shaft 201 is prevented. Shaft 201 having been rotated 12/20 of a revolution, gear 613 will rotate gear 607 an amount equal to 12/10 of a revolution so that a 2 will be uppermost on dial 601, and cam disk 627 rotated 12/20 of a revolution so that pin 630 moves onto cam faces 628 and pin 631 onto cam face 629, thus moving the lug 632 on transfer rod 623 out of engagement with one of the pins 633 and into alignment with a 635 pin and permitting spring 622 to rotate stop disk 633 1/20 of a revolution.

In the second bank of mechanism, gears 241ᵈ, 245ᶜ and 250ᵈ have been rotated amounts equal to the differences 5, 4 and 3, respectively, and gears 242ᵃ, 251ᵃ and 256ᵉ have been rotated the amounts of 7, 7 and 8, respectively. Stop plate 239ᴸ is fixed for rotation with shaft 202 and the pin in arm 240ˢ is in alignment with the 4 stop on that stop plate which will allow shaft 202 to rotate 4/20 of a revolution. Arm 243ˢ is fixed for rotation with arm 240ˢ and has its pin in alignment with the 2 stop on stop plate 244ᵐ which allows shaft 202 to make an additional 2/20 of a revolution. Arm 246ˢ is fixed for rotation with stop plate 244ᵐ and has its pin in alignment with the 9 stop on stop plate 247ᵏ, thus allowing shaft 202 to make an additional 9/20 of a revolution. Stop plate 248ᵐ is fixed for rotation with stop plate 247ᵏ and has its 8 stop in alignment with the pin of arm 249ˢ, thus allowing shaft 202 to make an additional 8/20 of a revolution. Arm 252ˢ is fixed for rotation with arm 249ˢ and has its pin in alignment with the 2 stop on stop plate 253ᵍ, thus allowing shaft 202 to make an additional 2/20 of a revolution. Stop plate 254ʰ is fixed for rotation with stop plate 253ᵍ and has its 1 stop in alignment with the pin on arm 255ˢ, thus allowing shaft 202 to make an additional 1/20 of a revolution; arm 255ˢ being fixed to sleeve 234 which is fixed for rotation with stop disk 633.

Shaft 202 has thus been allowed to make a total of 26/20 revolutions by the arms and stop plates or 1 and 6/20 revolutions. As stopping disk 634 was allowed to rotate 1/20 of a revolution by the amount carried over from shaft 201, shaft 202 has made a total of 1 and 7/20 revolutions, thus gear 614 will rotate dial 602 until a 7 is uppermost. As shaft 202 has made a complete revolution, the cam disk 627 secured to it will have made a complete revolution and, during its first half revolution, will have moved the transfer rod in that bank forwardly so that its lug 632 has come out of alignment with the outer circle of pins 637, and into alignment with the inner circle of pins 635 and allowed spring 622 to rotate stopping disk 638 1/20 of a revolution. During the second half revolution of the cam disk on shaft 202, transfer rod in that bank will be moved back to its original position and spring 622 allowed to rotate stopping disk 638 a second 1/20 of a revolution.

In the third bank of mechanism, gears 257ᵈ, 262ᵃ, 263ᵈ, 268ᶜ, 269ᵇ, 274ᵃ, 275ᵈ, 280ᶜ, 281ᵇ and 286ᵃ have been rotated amounts equaling 3, 9, 4, 5, 7, 6, 2, 3, 7 and 6 respectively. Arm 258ˢ is fixed for rotation with shaft 203 and has its pin in alignment with the 8 stop on stop plate 259ᵐ, thus allowing the shaft to rotate 8/20 of a revolution. Stop plate 260ᵍ is fixed for rotation with stop plate 259ᵐ and has its 0 stop in alignment with the pin on arm 261ˢ which is fixed for rotation with arm 264ˢ whose pin is in alignment with the 6 stop on stop plate 265ᵐ, thus allowing the shaft to rotate an additional 6/20 of a revolution. Stop plate 266ᵏ is fixed for rotation with stop plate 265ᵐ and has its 9 stop in alignment with the pin in arm 267ˢ, thus allowing the shaft to rotate an additional 9/20 of a revolution. Arm 270ˢ is fixed for rotation with arm 267ˢ and has its pin in alignment with the 1 stop on stop plate 271ʰ, thus allowing the shaft to rotate an additional 1/20 of a revolution. Stop plate 272ᵍ is fixed for rotation with stop plate 271ʰ and has its 9 stop in alignment with the pin in arm 273ˢ, thus allowing the shaft to rotate an additional 9/20 of a revolution. Arm 276ˢ is fixed for rotation with arm 273ˢ and has its pin in alignment with the 9 stop on stop plate 277ᵐ thus allowing the shaft to rotate an additional 9/20 of a revolution. Stop plate 278ᵏ is fixed for rotation with stop plate 277ᵐ and has its 9 stop in alignment with the pin in arm 279ˢ, thus allowing the shaft to make an additional 9/20 of a revolution. Arm 282ˢ is fixed for rotation with arm 279ˢ and has its pin in alignment with the 1 stop on stop plates 283ʰ, thus allowing the shaft to make an additional 1/20 of a revolution. Stop 248ᵍ is fixed for rotation with stop plate 283$^h$ and has its 9 stop in alignment with the pin in arm 285$^s$, thus allowing the shaft to make an additional 9/20 of a revolution; arm 285$^s$ being secured to sleeve 235 which has arm 637 secured to its other end. The shaft has thus been allowed to rotate 61/20 revolutions.

The arm 637 on shaft 203 rotated until it struck lug 643, or 9/20 of a revolution, as soon as the gear 215 on this shaft was rotated and disk 638 was allowed to rotate 2/20 of a revolution by the amount carried over from the second bank of mechanism which, added to the above mentioned 61/20 revolutions, makes a total rotation of 72/20 revolutions. Dial 603 will be rotated 7 and 2/10 times so that the 2 on its periphery is uppermost. The cam disk on shaft 203 will have made 7 half-revolutions, allowing disk 639 to rotate 7/20 of a revolution, as previously described.

In the fourth bank of mechanism gears 287$^c$, 292$^d$, 293$^a$, 298$^e$, 299$^c$, 304$^d$, 305$^a$, 310$^e$, 311$^c$ and 316$^e$ have been rotated amounts equal, respectively, to 3, 2, 8, 9, 4, 3, 5, 6, 2 and 6. Arm 288$^s$ is fixed to shaft 204 and has its pin in alignment with the 9 stop on stop plate 289$^k$ and permits the shaft to be rotated 9/20 of a revolution. Stop plate 290$^m$ is fixed for rotation with stop plate 289$^k$ and has its 9 stop in alignment with the pin of arm 291$^s$ and permits the shaft to be rotated an additional 9/20 of a revolution. Arm 294$^s$ is fixed for rotation with arm 291$^s$ and has its pin in alignment with the 6 stop on stop plate 295$^g$ and permits the shaft to make an additional 6/20 of a revolution. Stop plate 296$^h$ is fixed for rotation with stop plate 295$^g$ and has its 2 stop in alignment with the pin of arm 297$^s$ and permits the shaft to make an additional 2/20 of a revolution. Arm 300$^s$ is fixed for rotation with arm 297$^s$ and has its pin in alignment with the 9 stop of a stop plate 301$^k$ and permits the shaft to make an additional 9/20 of a revolution. Stop plate 302$^m$ is fixed for rotation with stop plate 301$^k$ and has its 8 stop in alignment with the pin in arm 303$^s$ and permits the shaft to make an additional 8/20 of a revolution. Arm 306$^s$ is fixed for rotation with arm 303$^s$ and has its pin in alignment with the 6 stop on stop plate 307$^g$ and permits the shaft to rotate an additional 6/20 of a revolution. Stop plate 308$^h$ is fixed for rotation with stop plate 307$^g$ and has its 0 stop in alignment with the pin of arm 309$^s$ which is fixed for rotation with arm 312$^s$ which has its pin in alignment with the 9 stop on stop plate 313$^k$ and permits the shaft to rotate an additional 9/20 of a revolution, stop plate 314$^h$ is fixed for rotation with stop plate 313$^k$ and has its 0 stop in alignment with the pin of arm 315$^s$ which is fixed for rotation with sleeve 236.

The arm 637 on the other end of sleeve 236 was allowed to rotate 7/20 of a revolution or until it abutted a lug 645 on stopping disk 639 which was rotated 7/20 of a revolution by the amount carried over from the third bank of mechanism so that shaft 204 was allowed to rotate 7/20 of a revolution by the movement of arm 637 and 7/20 of a revolution by the amount carried over from the third bank of mechanism which, added to the revolutions allowed by the converting units on the shaft, make a total rotation of 72/20 revolutions. Dial 604 will be rotated 7 and 2/10 times, leaving the 2 on its periphery uppermost, and the cam disk on shaft 204 wil be given seven half-revolutions, causing stopping disk 640 in the fifth bank to be rotated 7/20 of a revolution.

In the fifth bank of mechanism, gears 317$^d$, 322$^c$, 323$^b$, 328$^a$, 331$^c$ and 332$^b$ have been rotated amounts equal to 1, 2, 8, 7, 3 and 5, respectively, shaft 205 permitted to rotate 7/20 of a revolution by the amount carried over from the fourth bank, and 6/20 of a revolution by the amount that arm 637 is spaced from lug 647 on disk 640. In the converting mechanism, arm 318$^s$ is fixed for rotation with shaft 205 and has its pin in alignment with the 0 stop on stopping plate 319$^m$ which is fixed for rotation with stop plate 320$^k$ which has its 9 stop in alignment with the pin of arm 321$^s$ and permits the shaft to make 9/20 of a revolution. Arm 324$^s$ is fixed for rotation with arm 321$^s$ and has its pin in alignment with the 1 stop in stop plate 325$^h$ and allows the shaft to make an additional 1/20 of a revolution. Stop plate 326$^g$ is fixed for rotation with stop plate 325$^h$ and has its 2 stop in alignment with the pin of arm 327$^s$ and allows the shaft to rotate an additional 2/20 of a revolution. Stop plate 329$^k$ is fixed for rotation with arm 327$^s$ and has its 9 stop in alignment with the pin of arm 330$^s$ and allows the shaft to rotate an additional 9/20 of a revolution. Arm 333$^s$ is fixed for rotation with arm 330$^s$ and has its pin in alignment with the 0 stop on stop plate 334$^h$ which is fixed to sleeve 237.

The converting mechanism in this bank thus allows shaft 205 to make a total of 21/20 revolutions which, added to the 7/20 of a revolution carried over from the fourth bank and the 6/20 of a revolution permitted by lug 647, makes a total of 34/20 of a revolution, causing the stopping disk fixed on this shaft to rotate three half-revoltions and permit stopping disk 639 to rotate 3/20 of a revolution, as previously described. Dial 605 will be rotated three and 4/10 revolutions, leaving the 4 on its periphery uppermost.

In the sixth bank of mechanism, arm 336$^s$ is fixed for rotation with shaft 206 and has its pin in alignment with the 10 stop on stop plate 337$^k$ and permits the shaft to rotate 10/20 of a revolution. Stop plate 338$^h$ is fixed for rotation with stop plate 337$^k$ and has its 1 stop in alignment with the pin of arm 339$^s$ and permits the shaft to rotate an additional 1/20 of a revolution making a total of 11/20 of a revolution. Arm 339$^s$ is fixed to one end of sleeve 238 and arm 637, which is fixed to the other end and normally abutting lug 644, has rotated 7/20 of a revolution in moving against lug 645, as previously described. This stopping disk was rotated 3/20 of a revolution by the amount carried over from the fifth bank of mechanism which, added to the rotation allowed by lug 645 and the rotation allowed by the arms and stop plates, amounts to 21/20 of a revolution. Dial 606 will be rotated 21/10 of a revolution and the 1 upon its periphery will be uppermost when the dial ceases to rotate. As there is no additional dials or mechanism at the left of the sixth bank, the two of the 21 is lost. The amounts shown on the dials are 142,272 which is the product of 456 and 312.

The crank is now given a fourth complete revolution which will simultaneously clear the machine and restore each mechanism to its starting position. As cam 714 makes its fourth quarter-revolution, pin 657 moves from that portion of cam slot 715 having the greater radius into that part having the lesser radius, as best shown in Figure 3, and draws shifter 648 rearwardly, moving the stopping disks out of engagement with the lugs on the transfer rods. This allows springs 622 and 221 to immediately rotate shafts 201 to 206 and everything carried by them until the lug 655 on each stopping disk engages the upper side of the extension 654 which coacts with that disk.

The first pin 734 rides into a slot 733 in Geneva gear 724 and rotates it one-quarter of a revolution. As each pin rides out of slot 733, the following pin engages the following slot and, as there are four pins, gear 724 is given a complete revolution; recesses 732 providing clearance for its corners while parts 730 of the periphery of disk 713 provides clearance for the corners of Geneva gear 725.

As gear 723 is fixed for rotation with gear 724 and meshes with idler 735 which meshes with gear 737, sprocket 740 will be rotated in a direction opposite to that in which it was rotated by the previous rotation of the crank, thus rotating gears 214 and 215 the same amount as previously but in the opposite direction. As gears 214 and 215 rotate, they will unwind springs 221 and, when the tension in such spring is removed, each of shafts 201, 202, 203, 204, 205 and 206 will be rotated in a direction opposite to its former direction of rotation and returned to its starting position.

As each shaft rotates, the pin in each arm "s" will come in contact with the back or neutral face of the stop plate with which it is coacting so that the stopping plates and arms on each shaft are consecutively rotated in the opposite order and in the opposite direction to that in which they were rotated during the converting action previously described.

The spring 356 on each arm "s" causes the gear with which the arm is coacting to rotate with it. When the arms "s" on shafts 201 and 202 have rotated until their pins 355 are abutting the neutral faces of the stopping disks with which they are coacting, stopping disks 619 and 633 will be rotated until the lugs 655 on those disks abut extensions 654. When the pins in the arms "s" on shafts 203, 204, 205 and 206 are abutting the netural faces of the stopping disks with which they coact, the stopping disks on those shafts will be rotated until the lugs 655 on them abut extensions 654. After the stopping disks are thus held against rotation, continued rotation of the shafts winds up springs 622 until they are under their original tension, thus putting the registering mechanism in starting position.

At the time that the stopping disks start to rotate, lugs 759 on cam 714 will abut the sloping face of arm 379 and swing it outwardly, causing arms 376 and 377 to shove a bar 361 transversely of the machine and bring hook arms 373 in alignment with pins 374 on the converting gears. As the shafts make their final revolution to bring lugs 655 in engagement with extensions 654, pins 374 will abut hook arms 373 and each gear will be stopped in its zero or starting position. As cam 714 continues to rotate, lug 759 will pass beyond arm 379 and permit spring 378 to retract arms 376 and 377 and draw hook arms 373 out of alignment with pins 374.

Near the completion of the fourth revolution of the crank, the last pin 734 rides out of a slot in Geneva gear 724 and turns one of its faces 729 into engagement with face 728 on disk 711 and a face 729 on Geneva gear 725 onto face 728 on disk 713 so that these gears are held against rotation. At the same time, pins 422, 433 and 425 start to ride from cam faces 748 and 749 down onto cam faces 742 and 743 and, at the completion of the fourth revolution these pins have ridden onto these cam faces, as shown in Figure 3, and the distributing mechanism is in starting position or as shown in the drawings.

We claim:—

1. In a machine for obtaining the product of two numbers including tabulating mechanism by which the device is selectively set, said tabulating mechanism including keys arranged in columns at least equaling the number of digits in the numbers to be multiplied and each column containing nine keys; distributing mechanism selectively controlled by the tabulating mechanism; a plurality of banks of converting mechanism for receiving the numbers from the distributing mechanism, obtaining the quarter-squares of their sum and obtaining the complement of the quarter-square of their difference and adding it to the quarter-square of the sum to obtain the product of the two numbers; registering mechanism for receiving the product from the converting mechanism and registering it, and driving mechanism for actuating the distributing, converting and registering mechanisms.

2. A machine for obtaining the product of two multi-digit numbers including tabulating mechanism upon which the digits of both numbers may be impressed; a plurality of banks of converting mechanism for obtaining the difference between the quarter-square of the sum and the quarter-square of the difference between each two integers transferred to each bank; distributing mechanism for receiving the numbers from the tabulating mechanism and transferring each integer of each number to the corresponding bank of converting mechanism and to banks of converting mechanism adjacent said bank; registering mechanism for receiving the sum in each bank of the difference between the quarter-squares in that bank; registering it, and driving mechanism for actuating all of said mechanisms.

3. A machine for obtaining the product of two numbers including tabulating mechanism by which the device is selectively set, distributing mechanism selectively controlled by the tabulating mechanism, converting mechanism arranged in a plurality of banks and having gears adapted to be rotated by the distributing mechanism amounts equal to the integers of the numbers; actuation of the machine to set up the first number causing the gears to be rotated in one direction and actuation of the machine to set up the second number causing one-half of the gears to be rotated in the same direction, to produce the sum of two integers on some of such gears, and the other half in the opposite direction to produce the difference between two integers on other of those gears; mechanism coacting with each gear for obtaining one digit of the quarter-square of the sum or difference which that gear has been rotated, and means for obtaining the difference in each bank between the total of the quarter-squares of the sums and the total of the quarter-squares of the differences, registering mechanism for receiving said difference and registering the amount equal it, and driving mechanism for actuating the several mechanisms.

4. A machine, as set forth in claim 3, in which the mechanism for obtaining the quarter-square of the amount equal the rotation of a gear includes a cam on each gear, a pin movable by the cam radially of the gear, and a series of stops each of which is so spaced that it permits the pin to rotate about the axis of the gear an amount equal to one digit of the quarter-square of the amount which the gear has been rotated.

5. A machine, as set forth in claim 3, in which the gears and converting mechanisms are mounted upon a plurality of shafts and include a cam on each gear, a stop plate on the shaft adjacent each gear; an arm on the shaft between the cam and stop plate, a pin slidable in the arm radially of the gear, and a series of stops on the stop plate each of which is so spaced that it will permit the arm to rotate about the shaft an amount equal to one digit of the quaater-square of the amount which that gear has been rotated.

6. A machine, as set forth in claim 3, further characterized by having shafts upon which the converting gears are mounted, a cam on each gear, a stop plate on the shaft adjacent each gear, an arm on the shaft between the cam and stop plate, a pin slidable in the arm and coacting with the stop plate for obtaining one digit of the quarter-square of the amount which that gear has been rotated, a driving gear rotatable on each shaft, a spiral spring connecting each driving gear to its shaft for rotating the shaft when the driving gear is rotated, and means for rotating the driving gears.

7. In a multiplying machine, having tabulating mechanism for selectively setting the device converting mechanism having gears selectively controlled by the tabulating mechanism, and mechanism for obtaining the difference between the quarter-squares of the sum and difference of the numbers, registering mechanism for receiving the sum of the quarter-squares and registering it, distributing mechanism, driving mechanism for actuating the said distributing mechanism including a frame slidable relatively to the other mechanisms and driven shafts rotatable in the frame, a fixed strut, driving shafts rotatable in the frame and strut and operatively connected to the tabulating mechanism, sleeves on all the shafts, keys in the sleeves, gears slidable on the sleeves and meshing with the converting gears, bars in the frame for holding the gears against axial movement relatively to the frame, means for moving the frame to bring the gears out of and into mesh with the converting gears, and means for moving the sleeves to bring the keys out of engagement with some gears and into engagement with other gears.

8. In a multiplying machine, having tabulating mechanism for selectively setting the device, converting mechanism having gears selectively controlled by the tabulating mechanism and mechanism for obtaining the difference between the quarter squares of the sum and difference of the numbers, registering mechanism for receiving the sum of the quarter-squares and registering it, distributing mechanism, driving mechanism for actuating the distributing mechanism, said distributing mechanism including a frame slidable relatively to the other mechanism and driven shafts rotatable in the frame, a fixed strut, driving shafts rotatable in the frame and strut and operatively connected to the tabulating mechanism, sleeves on all the shafts, keys in the sleeves, gears slidable on the sleeves and meshing with the converting gears, bars in the frame for holding the gears against axial movement relatively to the frame, means for moving the frame to bring the gears out of and into mesh with the converting gears, shifters fixed axially of the shafts for sliding them axially to bring keys in the sleeves out of engagement with some of the gears and into engagement with other gears, and means for moving the shifters.

9. In a multiplying machine, having tabulating mechanism for selectively setting the device, converting mechanism having gears selectively controlled by the tabulating mechanism, and mechanism for obtaining the difference between the quarter-squares of the sum and difference of the numbers, registering mechanism for receiving the sum of the quarter-squares and registering it, distributing mechanism, driving mechanism for actuating the distributing mechanism said distributing mechanism including a frame slidable relatively to the other mechanisms and driven shafts rotatable in the frame, a fixed strut, driving shafts rotatable in the frame and strut and operatively connected to the tabulating mechanism, sleeves on all the shafts, keys in the sleeves, gears slidable on the sleeves and meshing with the converting gears, bars in the frame for holding the gears against axial movement relatively to the frame, means for moving the frame to bring the gears out of and into mesh with the converting gears, shifters fixed axially of the shafts, an arm on a shifter, and a pin in the arm and abutting a cam for moving the shifters to slide the shafts in the frame and bring keys in the sleeves out of engagement with some of the gears and keys into engagement with other gears.

10. In a multiplying machine, having tabulating mechanism selectively setting the device, converting mechanism having gears selectively controlled by the tabulating mechanism, and mechanism for obtaining the difference between the quarter-squares of the sum and difference of the numbers, registering mechanism for receiving the sum of the quarter-squares and registering it, distributing mechanisms, driving mechanism for actuating the distributing mechanism said distributing mechanism including a frame slidable relatively to the other mechanisms, driven shafts rotatable in the frame, rotatably mounted driving shafts operatively connected to the tabulating mechanism, sleeves on all the shafts, keys in the sleeves, gears slidable on the sleeves and meshing with the converting gears, bars in the frame for holding the gears against axial movement relatively to the frame, arms on the frame, pins in the arms abutting cams on the shaft for sliding the frame to move the gears out of mesh with the converting gears, resilient means for holding the pins in contact with the cams, shifters fixed axially of the shafts, an arm on a shifter, a pin in the arm abutting a cam for moving the shifter in the opposite direction to bring keys into engagement with some of the gears and out of engagement with other gears.

11. In a multiplying machine having tabulating mechanisms, distributing mechanism, converting mechanism and registering mechanism, means for actuating said mechanisms including a main shaft, Geneva disks on the main shaft, Geneva gears engaging the disks, a driving disk between the Geneva disks for rotating the Geneva gears one after the other, a counter shaft so geared to the Geneva gears that it will be rotated in one direction by one Geneva gear and in the opposite direction by the other Geneva gear, means for transmitting movement of the counter shaft to the converting mechanism, a gear operatively connected to the tabulating mechanism, means on the main shaft for actuating said gear and actuating the tabulating mechanism, means connecting the tabulating mechanism to the distributing mechanism for actuating it, cams on the main shaft, arms on the distributing mechanism abutting the cams for moving said mechanism relatively to the converting mechanism, and means for rotating the main shaft.

12. In a multiplying machine having tabulating mechanism, distributing mechanism, converting mechanism, and registering mechanism, all of said mechanisms having a plurality of gears, means for actuating said mechanisms including a main shaft, Geneva disks on the main shaft, Geneva gears engaging the disks, a driving disk between the Geneva disks for rotating the Geneva gears one after the other, a counter shaft so geared to the Geneva gears that it will be rotated in one direction by one Geneva gear and in the opposite direction by the other Geneva gear, means for transmitting movement of the counter shaft to the converting mechanism to rotate it in one direction under the influence of one Geneva gear and in the reverse direction under the influence of the other Geneva gear, cams on the main shaft, a rockably mounted segmental gear operatively connected to the tabulating mechanism, an arm on the segmental gear engaging a cam, means connecting the tabulating mechanism to the distributing mechanism for actuating it arms on the distributing mechanism abutting the cams for moving said mechanism relatively to the converting mechanism, means coacting with a cam for stopping the gears of the converting mechanism in fixed positions as the converting mechanism is rotated in the reverse direction, and means for rotating the main shaft.

13. In a device of the class described, tabulating mechanism, distributing mechanism and converting mechanism, said converting mechanism including a member having stops thereon arranged in relative positions circumferentially corresponding to the successive unit digits in all possible values, in order, of the quarter-square of the sum of the digits, and spaced radially in successive positions, a stop arm, a slide on said arm having laterally projecting pins, one of said pins being adapted to selectively engage said stops, and a cam adapted to be engaged by the other pin on the slide to selectively position the pin co-operating with the stops, substantially as described.

14. A device as set forth in claim 13 further characterized by a similar stop member, arm and cam, with the stops and cam arranged to correspond radially, in order, to values of the tens digits in all possible values of the quarter-square of the sum of the digits, in successive stages in the revolution of the cam.

15. In a device of the class described, a mechanism for tabulating the digits of multiplying factors, a distributing mechanism, a converting mechanism for the quarter squares of the sum and difference of all digits of one factor into all digits of the other factor, and a registering mechanism actuated by the conjoint action of the converting mechanisms.

16. In a device of the class described, a single tabulating mechanism upon which factors each of a plurality of digits may be impressed consecutively, a distributing mechanism operated directly from the tabulating mechanism, a bank of converting mechanisms for each partial product obtained from the sums and differences of the quarter squares of each digit of one factor into each digit of the other factor, said converting mechanisms being operated directly from the distributing mechanism, each bank transferring the components of said partial product accumulatively to succeeding banks, and a mechanism registering the final result actuated directly from the conjoint action of the converting mechanism.

17. A machine having parts upon which two factors may be impressed, each of which may contain a plurality of digits, means simultaneously computing both the sum and difference of all the digits of one factor into all the digits of the other factor, and mechanism employing said means to compute the product of said factors.

In testimony whereof we have signed our names to this specification.

HYMAN PINKEL.
BENJAMIN PINKEL.